United States Patent
Zhang et al.

(10) Patent No.: US 10,747,026 B1
(45) Date of Patent: Aug. 18, 2020

(54) ERGONOMIC SPACER FOR HEAD-MOUNTED WEARABLE DEVICE

(71) Applicant: AMAZON TECHNOLOGIES, INC., Seattle, WA (US)

(72) Inventors: Han Zhang, Mountain View, CA (US); Zhen Xu, Santa Clara, CA (US); Xuan Zhong, Mountain View, CA (US); Eliot Kim, Los Gatos, CA (US); Chung-Ling Hsu, Sunnyvale, CA (US); Jianchun Dong, Palo Alto, CA (US); Jung Sik Yang, Cupertino, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/472,000

(22) Filed: Mar. 28, 2017

(51) Int. Cl.
G02C 11/00 (2006.01)
G02C 5/14 (2006.01)
H04R 1/02 (2006.01)

(52) U.S. Cl.
CPC ........... G02C 11/10 (2013.01); G02C 5/14 (2013.01); H04R 1/028 (2013.01); H04R 2460/13 (2013.01)

(58) Field of Classification Search
CPC ... G02C 5/14; G02C 5/16; G02C 5/18; G02C 5/001; G02C 11/10; G02C 9/00; G02C 9/04; H04R 1/028; H04R 2460/11; H04R 2460/13
USPC ......................................................... 351/158
See application file for complete search history.

(56) References Cited

U.S. PATENT DOCUMENTS

| | | | |
|---|---|---|---|
| 2,151,706 A | 3/1939 | Hugo | |
| 3,030,455 A | 4/1962 | Pearson | |
| 3,665,122 A * | 5/1972 | Weiss | G02C 11/06 381/326 |
| 7,242,786 B2 | 7/2007 | Åsnes | |
| 7,809,147 B2 | 10/2010 | Giannetti | |
| 7,998,283 B2 | 8/2011 | Yang | |
| 8,989,410 B2 | 3/2015 | Hebenstreit | |
| 9,143,848 B2 | 9/2015 | Hebenstreit et al. | |
| 9,420,388 B2 | 8/2016 | Ball | |
| 9,482,882 B1 * | 11/2016 | Hanover | G02C 11/10 |
| 9,788,097 B2 | 10/2017 | Bullen et al. | |
| 10,042,186 B2 * | 8/2018 | Chao | G02C 11/10 |
| 2004/0101154 A1 | 5/2004 | Maekawa | |

(Continued)

FOREIGN PATENT DOCUMENTS

KR 1765718 B1 8/2017

OTHER PUBLICATIONS

Robinson, Ryan C., "Non-final Office Action dated May 18, 2018", U.S. Appl. No. 15/472,038, The United States Patent and Trademark Office, filed May 18, 2018.

(Continued)

Primary Examiner — Jordan M Schwartz
(74) Attorney, Agent, or Firm — Lindauer Law, PLLC

(57) ABSTRACT

A head-mounted wearable device (HMWD) may be fashioned that includes temples that pass near each ear of the user. To accommodate different head shapes and sizes, a head contact piece may be mounted to the temple. Head contact pieces with different profiles may be used to improve user comfort, aid in retaining the HMWD on the user's head, improve performance of output devices such as bone conduction speakers, and so forth.

20 Claims, 17 Drawing Sheets

(56) References Cited

U.S. PATENT DOCUMENTS

| | | | |
|---|---|---|---|
| 2010/0278362 A1* | 11/2010 | Kim | H04M 1/03 381/151 |
| 2010/0316235 A1* | 12/2010 | Park | H04R 1/025 381/151 |
| 2011/0234973 A1* | 9/2011 | Ye | G02C 11/00 351/158 |
| 2013/0018218 A1 | 1/2013 | Haller et al. | |
| 2013/0089229 A1 | 4/2013 | Kristo et al. | |
| 2013/0250232 A1* | 9/2013 | Belbey | G02C 7/02 351/158 |
| 2014/0064533 A1 | 3/2014 | Kasic | |
| 2014/0064536 A1* | 3/2014 | Kim | G02B 27/017 381/333 |
| 2014/0233765 A1 | 8/2014 | Andersson et al. | |
| 2014/0274229 A1* | 9/2014 | Fukuda | H04M 1/03 455/575.1 |
| 2015/0268475 A1* | 9/2015 | Lee | G06F 1/163 345/8 |
| 2016/0261956 A1 | 9/2016 | Collini et al. | |
| 2016/0363787 A1* | 12/2016 | Blum | G02C 5/008 |
| 2016/0381474 A1 | 12/2016 | Gustafsson et al. | |
| 2017/0115505 A1* | 4/2017 | Odom | G02C 5/14 |
| 2017/0219831 A1 | 8/2017 | Haddick et al. | |
| 2017/0318379 A1 | 11/2017 | Bullen et al. | |
| 2018/0234779 A1 | 8/2018 | Hsieh et al. | |
| 2019/0014425 A1 | 1/2019 | Liao et al. | |

OTHER PUBLICATIONS

Robinson, Ryan C., "Non-final Office Action dated Aug. 28, 2019", U.S. Appl. No. 15/472,038, The United States Patent and Trademark Office, dated Aug. 28, 2019.

Robinson, Ryan C., "Final Office Action dated Jan. 10, 2019", U.S. Appl. No. 15/472,038, The United States Patent and Trademark Office, dated Jan. 10, 2019.

* cited by examiner

ERGONOMIC SPACER FOR HEAD-MOUNTED WEARABLE DEVICE

BACKGROUND

Wearable devices provide many benefits to users, allowing easier and more convenient access to information and services. The head mounted device may provide output that is audible to the user.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
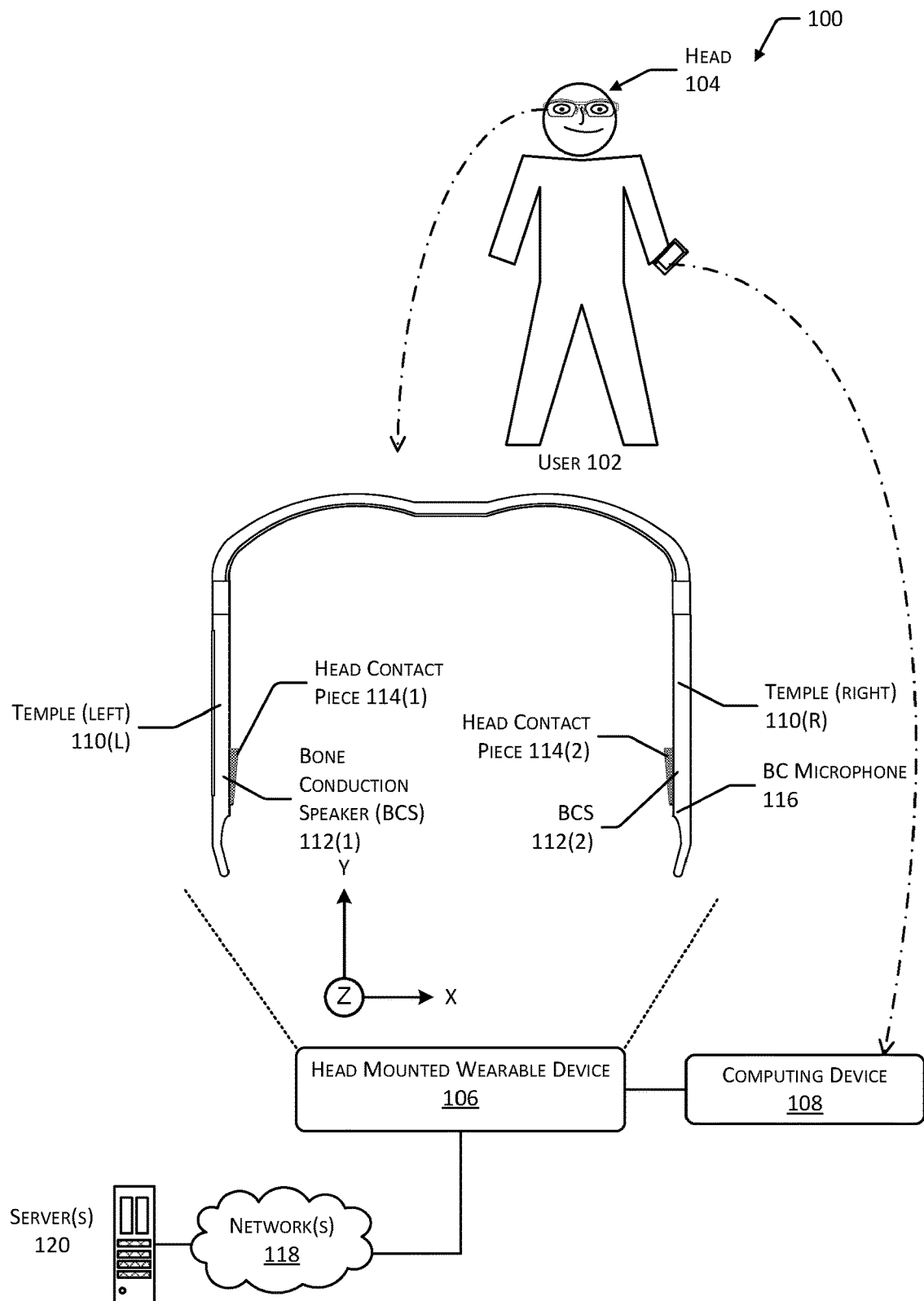
FIG. 1 depicts a system including a head-mounted wearable device equipped with bone conduction speakers (BCS) and a pair of head contact pieces, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

The structures depicted in the following figures are not necessarily according to scale. Furthermore, the proportionality of one component to another may change with different implementations. In some illustrations the scale or a proportionate size of one structure may be exaggerated with respect to another to facilitate illustration, and not necessarily as a limitation.

DETAILED DESCRIPTION

Wearable devices provide many benefits to users, allowing easier and more convenient access to information and services. For example, a head-mounted wearable device (HMWD) having a form factor that is ubiquitous and easily worn, such as eyeglasses, may facilitate access to information. Other form factors that may be used include protective goggles, headbands, hats, helmets, devices worn on or otherwise supported by the ear, and so forth.

The HMWD may utilize one or more different types of output devices, including a bone conduction speaker (BCS). The BCS allows audio output to be provided to a user of the HMWD with little or no audio being presented to the surrounding environment and bystanders. The BCS operates by generating mechanical vibrations that are transferred into the skull of the user. Those vibrations in turn vibrate the bones in the inner ear, which is then perceived as sound. In contrast, an air conduction speaker, such as a loudspeaker, generates compressive waves in the air which in turn cause vibration of the eardrum, and subsequently the bones in the inner ear.

The BCS operates most effectively when there is contact between a portion of the BCS and a portion of the user, such as the skull near the ear. This contact provides a mechanical pathway, other than the ambient air of an air conduction speaker, through which the mechanical vibrations may be propagated. However, the variation in size and shape of the human head precludes a "one-size-fits-all" solution. If the contact between the BCS and the user's head is incomplete, the operation of the BCS may be impaired resulting in a poor user experience. For example, incomplete contact may render the perceived volume of the audio produced by the BCS as too quiet, or having a poor quality. Incomplete contact may also reduce the stability of the HMWD on the user's head, leaving it prone to inadvertent shifting during wear or even falling off. Incomplete contact may also produce pressure points at the points of contact, resulting in a device which is uncomfortable to wear.

Described in this disclosure is a head contact piece (HCP) that may be affixed to the BCS to improve the contact between the BCS and the user's head. Different sizes of HCP with different profiles may be provided, and subsequently installed to the HMWD to provide the desired fit to the user. For example, a first HCP may have a pronounced wedge-shaped profile to accommodate heads with a first shape, while a second HCP may have a flatter shape to accommodate heads with a second shape. The HCP may be held in place using magnets, mechanical fasteners, or other mechanisms. For example, the HCP may include magnets that attract the HCP to ferrous materials in the BCS or other structure of the HMWD.

A variety of different HCPs may be envisioned that provide for different profile, sizes, composition, surface texture, hardness, and so forth. For example, a first HCP may have a body made of a very firm elastomer while a second HCP may have a body that is made of a very soft elastomer.

In some implementations the HCP may have an asymmetric profile, such as a wedge-shape that tapers from a thicker end to a thinner end. Registration features may be provided that facilitate proper installation in the desired orientation. For example, a portion of the BCS may protrude slightly from a surface of a temple of the HMWD. An end of the protrusion that is towards the front of the HMWD may be rounded, while the second end of the protrusion that is towards the back of the HMWD may be squared. The HCP may incorporate a corresponding recess that is rounded at the front and squared at the back, to accommodate the protrusion of the BCS.

In some situations, the user may change the HCPs to provide different functionality or features for a particular situation. For example, a user who is participating in a vigorous sporting event may changeout the HCPs on their HMWD to a softer elastomer with a surface texture providing more grip and thicker profile that increases overall clamping force of the HMWD on the user's head.

By utilizing the structures described herein, the HMWD is able to provide improved audio output using BCS. The use of the HCP to provide a good fit to the user's head also improves mechanical coupling, facilitating the production of desired levels of audio output using less electrical power. As a result, battery life of the HMWD may be improved. User comfort is also improved by allowing for easy customization of the fit. The ease with which HCPs may be changed out also reduces the overall cost for the HMWD, allowing one size of HMWD to more readily be fitted to a larger population of users.

Illustrative System

FIG. 1 depicts a system 100 in which a user 102 is wearing on their head 104 a head-mounted wearable device (HMWD) 106 in a general form factor of eyeglasses. In other implementations, other form factors may be utilized. For example, the techniques and devices may be used in conjunction with protective goggles, headbands, hats, helmets, and so forth.

The HMWD 106 may be in communication with one or more affiliated computing devices 108. For example, the HMWD 106 may communicate with the computing device 108 using a personal area network (PAN) such as Bluetooth®. The computing device 108 may be used at least in part to provide additional resources, such as access to a network, compute resources, storage, display output, and so forth. The computing devices 108 may comprise a smart phone, tablet, local server, in-vehicle computer system, and so forth. For example, the computing device 108 may comprise a smart phone that includes a display. The display of the smart phone may be used to present a graphical user interface.

The HMWD 106 may include one or more temples 110. During normal wear, in one implementation the temples 110 may extend along the head 104 of the user 102, above the ear.

The HMWD 106 may deliver audio output to the user 102, such as communication audio from a telephone call, entertainment content, navigational directions, earcons, and so forth. To provide audio output to the user 102, the HMWD 106 may include one or more bone conduction speakers (BCSs) 112. The BCS 112 generates a mechanical vibration that, when imparted to the head 104 of the user 102, is perceived by the user 102 as audio. The BCS 112 may include an electrically moveable element that, responsive to an electrical signal, provides mechanical motion. For example, the electrically moveable element may comprise a piezoelectric material, an electromagnetic coil such as a voice coil or solenoid, an electroactive polymer, and so forth. The BCS 112 may be placed within the HMWD 106 such that, during normal wear, a portion of the BCS 112 is in contact with the temporal bone of the head 104. In other implementations, the BCS 112 may be in contact with other portions of the user's head 104 or body, such as the torso. In some implementations the BCS 112 may be used as an input device. For example, mechanical vibrations of the head 104 may produce electrical signals in the electrically moveable element. Continuing the example, the BCS 112 may be operated as a bone conduction microphone.

In some implementations, the portion of the BCS 112 may be in direct contact with the head 104. However, the size and shape of the head 104 may vary from user 102 to user 102. One or more head contact pieces (HCPs) 114 may be arranged proximate to the BCS 112. For example, the HCP 114(1) shown here is in contact with the portion of the BCS 112(1) while the HCP 114(2) is in contact with the portion of the BCS 112(2). The HCP 114 may be removably affixed, such that the user 102 may manually remove the HCP 114 if a change is desired, but that the HCP 114 otherwise remains in place during wear. The HCP 114 may be affixed to one or more of the BCS 112 or the temple 110 using one or more mechanisms. In one implementation, magnets may be used to provide an attractive force that holds the HCP 114 in place. In another implementation, mechanical features may be used to hold the HCP 114 in place. For example, the mechanical features may comprise a ridge on the HCP 114 and a groove in the BCS 112. When affixed, the ridge engages the groove, maintaining the HCP 114 in place with respect to the BCS 112. In another example, the BCS 112 may include one or more recesses, holes, or other features within which a mechanical feature of the HCP 114 may be affixed. In yet another implementation an adhesive may be used to join the HCP 114 to one or more of the temple 110 or the BCS 112. For example, a pressure sensitive adhesive (PSA) may be used to stick the HCP 114 to the BCS 112, while still allowing the HCP 114 to be removed. In yet another implementation, a hook and loop fastener or touch fastener may be used to affix the HCP 114 to one or more of the BCS 112 or the temple 110. In other implementations the HCP 114 may be permanently affixed, or may be integral with another component. For example, the structure of the BCS 112 may incorporate the HCP 114. In another example, the temple 110 may incorporate the HCP 114.

The HCP 114 may comprise an elastomeric material. The elastomeric material may be compliant enough to conform at least partially to the contour of the head 104. For example, the HCP 114 may comprise one or more thermoplastic elastomers exhibiting a Shore hardness of 60A. In other implementations, the HCP 114 may comprise a rigid material such as acrylonitrile butadiene styrene (ABC), polyvinyl chloride (PVC), carbon fiber composite, metal, and so forth. The HCP 114 may comprise a combination of soft and hard materials. For example, a rigid inner component such as a magnet may be coated with an elastomer.

The HCP 114 may utilize elastomeric material that includes other materials. In one implementation, a body of the HCP 114 may comprise an elastomer that supports one or more types of ferromagnetic particles. As a result, the HCP 114 may be formed to provide a magnetic field, or may include ferromagnetic materials such as iron that are attracted to magnetic fields. For example, while in a liquid state, a magnetic powder comprising one or more types of magnetized or magnetizable ferromagnetic materials may be mixed with a polymer, such as silicone elastomer, resulting in particles being supported within the silicone elastomer after the elastomer cures. In some implementations an external magnetic field may be imposed during fabrication of the elastomeric body to impose a magnetic field in the ferromagnetic materials, rendering the particles magnetized, to align the magnetic fields of the magnetized particles, and so forth. With the imposition of this external magnetic field, the particles may exhibit a common overall magnetic field orientation. For example, the magnetized body of the HCP 114 may exhibit an overall magnetic field having a pattern consistent with a bar magnet.

The HMWD 106 may obtain input using a BC microphone 116 that is responsive to the vibrations produced by the user 102, such as while vocalizing. The BC microphone 116 may comprise a voice coil, microelectromechanical system (MEMS) element, and so forth that generates data in response to mechanical displacement. For example, the BC microphone 116 may comprise an accelerometer. The BC microphone 116 may be arranged to be in contact with the skin above a bony or cartilaginous structure. For example, a portion of the temple 110 of the HMWD 106 may be mechanically coupled to the BC microphone 116 such that vibrations of the temporal bone or other structures upon which the BCS 112 or the HCP 114 rests are transmitted to the BC microphone 116. In another example, where the HMWD 106 is in the form of eyeglasses, nose pads of a nosepiece may be mechanically coupled to the BC microphone 116. In other implementations, the BC microphone 116 may be located elsewhere with respect to the HMWD 106, or worn elsewhere by the user 102.

The HMWD 106 may be in communication with the other devices via one or more networks 118. For example, the network 118 may comprise a personal area network, local area network, metropolitan area network, wide area network, and so forth. The HMWD 106 may use the networks 118 to access one or more services that are provided by the other devices. For example, the HMWD 106 may establish communication with one or more servers 120. These one or more servers 120 may provide one or more services, such as automated speech recognition, information retrieval, messaging, and so forth.

The structures depicted in this and the following figures are not necessarily according to scale. Furthermore, the proportionality of one component to another may change with different implementations. In some illustrations, the size of one structure may be exaggerated with respect to another to facilitate illustration, and not necessarily as a limitation.

The objects described herein may be affixed to one another using one or more of magnetic fields, mechanical interference fits, fasteners, adhesives, welding, and so forth. The affixation of one object to another, or one portion of an object to another, may be reversible or not. For example, a mechanical interference fit may include a tab that cannot be released once it is been engaged. It is understood, that these various techniques to fix one object to another may be used in various combinations with one another.

Figure 2:
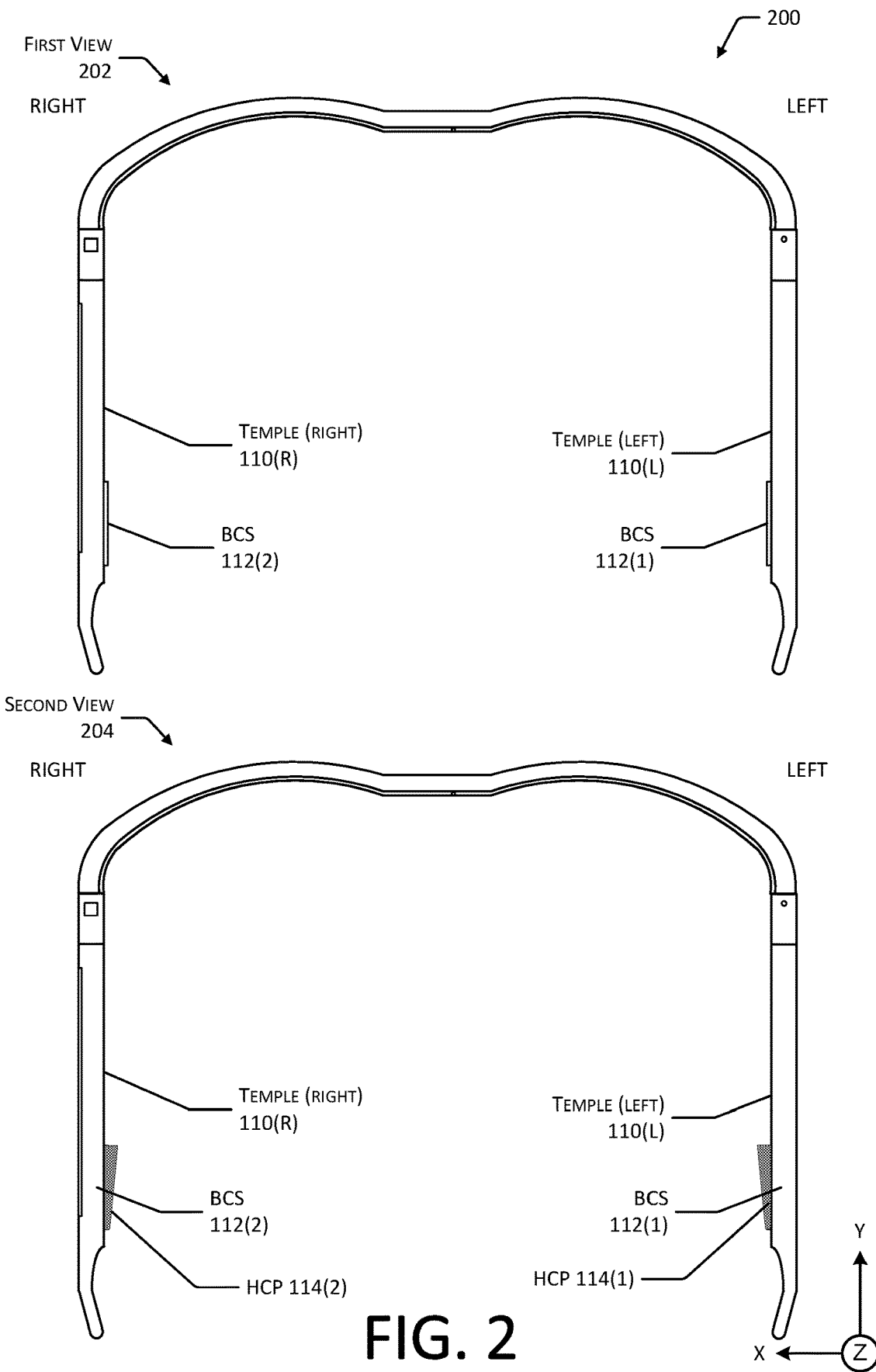
FIG. 2 depicts views of a head-mounted wearable device with and without head contact pieces installed, according to some implementations.

FIG. 2 depicts views of the HMWD 106 with and without HCPs 114 installed, according to some implementations. For example, a first view 202 depicts the HMWD 106 without HCPs 114 affixed. For some users 102, the shape of their head 104, personal preferences, and so forth, may result in the surface of the BCS 112 providing sufficient contact between the BCS 112 and the head 104.

As shown in a second view 204, one or more HCPs 114 may be installed. This installation may improve performance of one or more of the BCS 112, improve user 102 comfort, improve performance of the BC microphone 116, and so forth. For example, an HCP 114 may be selected that accounts for the particular shape of the head 104 and improves the transmission of mechanical vibrations between the BCS 112 and the head 104.

While this and the following illustrations depict HCPs 114 of the same profile on both sides, it is understood that in some implementations each side may utilize a different HCP 114. For example, a user 102 may find it more comfortable to have a flat HCP 114 on the left and a tapered HCP 114 on the right.

As described below, the HCP 114 may be configured to be replaceable. For example, the user 102 may be able to install or remove the HCP 114 from the HMWD 106. This installation may be tool-free, or may utilize a tool. For example, when the HCP 114 is held to the HMWD 106 using magnets, the user 102 may remove the HCP 114 by applying a force to a long edge of the HCP 114, pulling the HCP 114 away. In other implementations a tool such as a spudger or shim may be used to pry the HCP 114 free from the HMWD 106.

Figure 3:
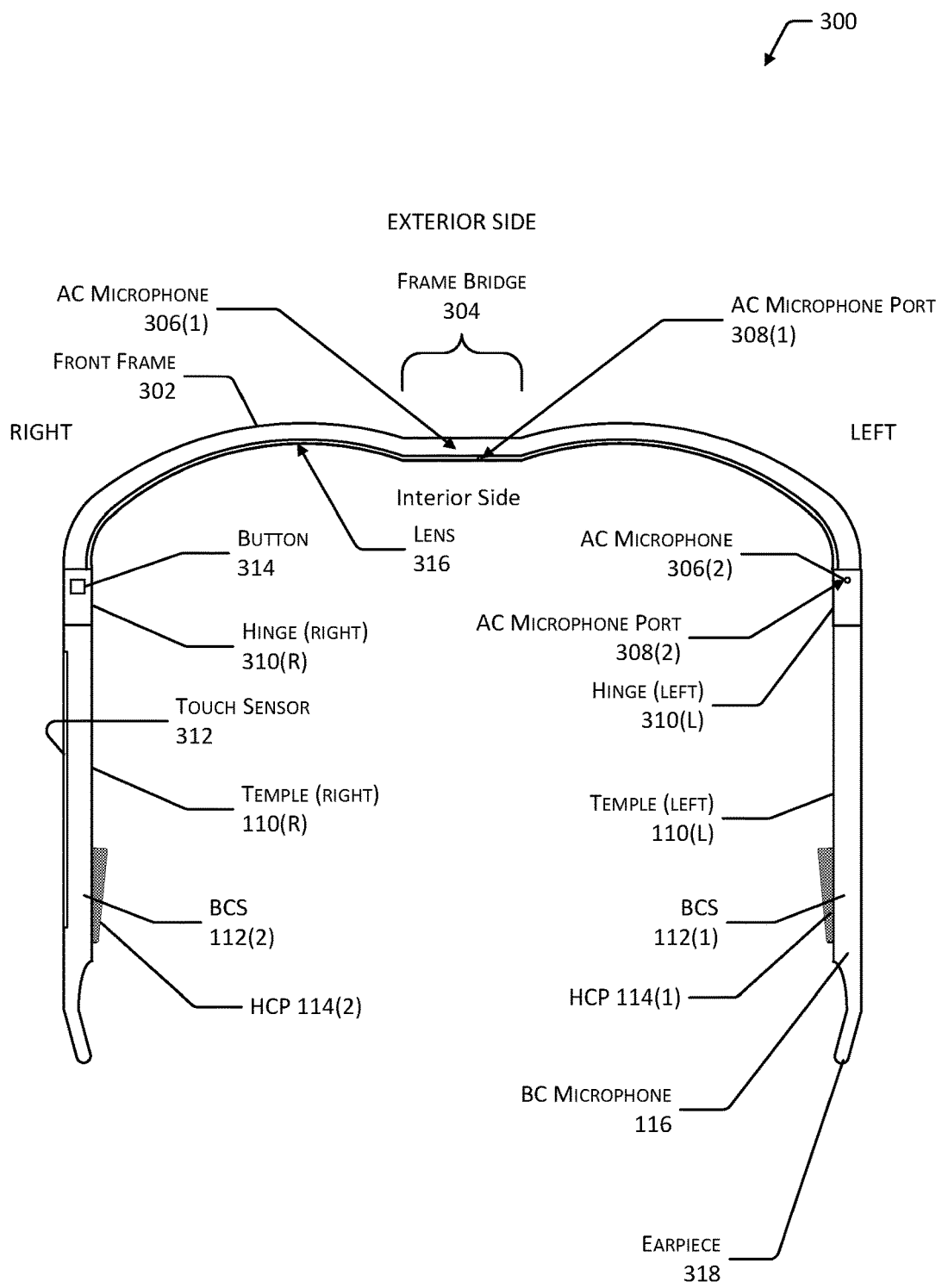
FIG. 3 depicts a head-mounted wearable device, according to some implementations.

FIG. 3 depicts a second view 204 of the HMWD 106 from the underside, according to some implementations.

A front frame 302 is depicted. The front frame 302 may include a left brow section and a right brow section that are joined by a frame bridge 304. In some implementations, the front frame 302 may comprise a single piece of material, such as a metal, plastic, ceramic, composite material, and so forth. For example, the front frame 302 may comprise 6061 aluminum alloy that has been milled to the desired shape. In another example, the front frame 302 may comprise injection molded plastic. In other implementations, the front frame 302 may comprise several discrete pieces that are joined together by way of mechanical engagement features, welding, adhesive, and so forth.

A nosepiece (not shown) may be affixed to the lens bridge. One or more nose pads may be affixed to, or integral with, the nosepiece. The nose pads aid in the support of the front frame 302 and may improve comfort of the user 102. In some implementations the nosepiece may be integral with the frame bridge 304.

The HMWD 106 may obtain input using an AC microphone 306. The AC microphone 306 may comprise a diaphragm, MEMS element, or other elements that generate data in response to the displacement of air by sound waves. AC microphonedata may be generated that is indicative of the sound detected by the AC microphone 306. In some implementations, the HMWD 106 may include a plurality of AC microphones 306. For example, a pair of AC microphones 306 to be operated in conjunction. Continuing the example, beamforming techniques may be used to provide some degree of gain or directionality, such that audio uttered by the user 102 may be acquired while reducing the effect of noise in the ambient environment. In another example, the first AC microphone 306 may exhibit a particular frequency response while the second AC microphone 306 exhibits a different frequency response.

The AC microphone 306 may utilize one or more AC microphone ports 308. The AC microphone ports 308 allow vibrations from the medium that is carrying the sound to pass to the AC microphone 306, such as the air in the ambient environment, that is to be detected by the AC microphone 306. The AC microphone ports 308 may comprise a passageway or hole in a housing or cover, one or more channels or choose the direct the vibrations to the AC microphone 306, and so forth.

In some implementations, an AC microphone 306 may be located in the front frame 302, such as in the frame bridge 304. For example, the nosepiece may include an AC microphone port 308. The AC microphone port 308 may comprise a passageway or hole through the nosepiece, that allows sound vibrations to be conveyed to an AC microphone 306(1) located within the frame bridge 304.

One or more electrical conductors, optical fibers, transmission lines, and so forth, may be used to connect various components of the HMWD 106. For example, a flexible printed circuit (FPC) may be arranged within the front frame 302. The FPC allows for an exchange of electrical signals, optical signals, radio signals, power, and so forth, between devices in the HMWD 106. For example, the FPC may be used to provide connections for electrical power and data communications between electronics in one or both of the temples 110 of the HMWD 106.

One or more hinges 310 may be affixed to, or an integral part of, the front frame 302. Depicted are a left hinge 310(L) and a right hinge 310(R) on the left and right sides of the front frame 302, respectively. The left hinge 310(L) is arranged at the left brow section, distal to the frame bridge 304. The right hinge 310(R) is arranged at the right brow section distal to the frame bridge 304.

A temple 110 may couple to a portion of the hinge 310. For example, the temple 110 may comprise one or more components, such as a knuckle, that mechanically engage one or more corresponding structures on the hinge 310.

The left temple 110(L) is attached to the left hinge 310(L) of the front frame 302. The right temple 110(R) is attached to the right hinge 310(R) of the front frame 302.

Figure 11:
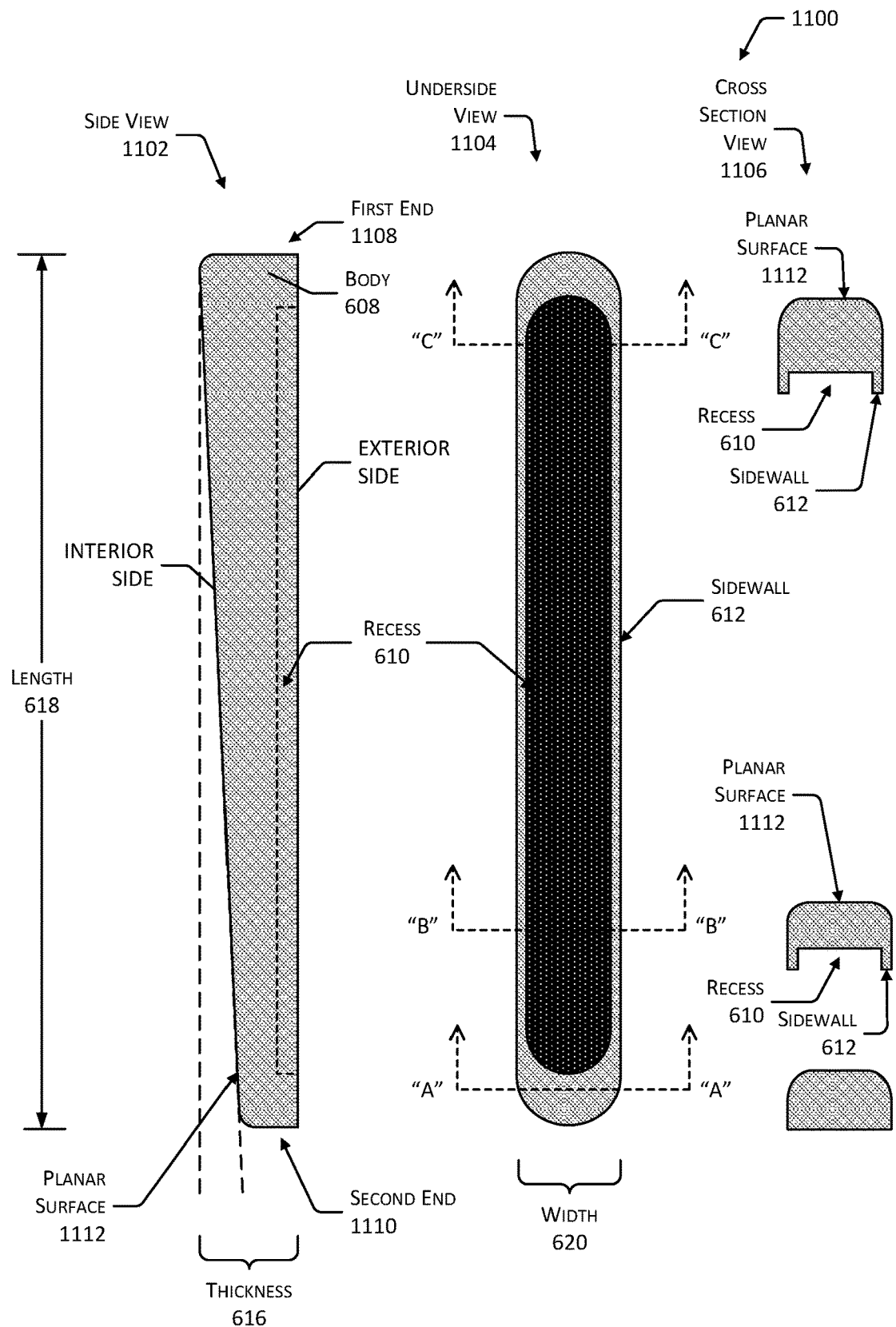
FIG. 11 depicts various views of a head contact piece with a wedge profile, according to some implementations.

The hinge 310 permits rotation of the temple 110 with respect to the hinge 310 about an axis of rotation. The hinge 310 may be configured to provide a desired angle of rotation. For example, the hinge 310 may allow for a rotation of between 0 and 120 degrees. As a result of this rotation, the HMWD 106 may be placed into a folded configuration, such as shown in FIG. 11. One implementation of the folded configuration is depicted in FIG. 11 below.

A touch sensor 312 may be located on one or more of the temples 110. For example, the touch sensor 312 may comprise a capacitive touch sensor, a force sensitive resistor touch sensor, an optical touch sensor, and so forth. Touch sensor data may be generated that is indicative of the location, direction, duration, and so forth of the touch.

One or more buttons 314 may be placed in other locations on the HMWD 106. For example, a button 314(1) may be emplaced within, or proximate to, the right hinge 310(R), such as on an underside of the right hinge 310(R).

The HMWD 106 may include one or more lenses 316. The lenses 316 may have specific refractive characteristics, such as in the case of prescription lenses. The lenses 316 may be clear, tinted, photochromic, electrochromic, and so forth. For example, the lenses 316 may comprise plano (non-prescription) tinted lenses to provide protection from the sun. In some implementations, only a single lens 316 may be installed. The lenses 316 may provide other functionality as well. For example, the lenses 316 may act as a surface onto which an image may be presented from an electronic display.

An earpiece 318 may extend from a portion of the temple 110 that is distal to the front frame 302. The earpiece 318 may comprise a material that may be reshaped to accommodate the anatomy of the head 104 of the user 102. For example, the earpiece 318 may comprise a thermoplastic that may be warmed to predetermined temperature and reshaped. In another example, the earpiece 318 may comprise a wire that may be bent to fit. The wire may be encased in an elastomeric material.

One or more sensors may be placed on the HMWD 106. For example, an AC microphone 306 may be located at the frame bridge 304 while a bone conduction (BC) microphone 116 may be emplaced within or proximate to the left hinge 310(L), such as on the underside of the left hinge 310(L). The BC microphones 116 and the AC microphones 306 are maintained at a fixed distance relative to one another during operation. For example, the relatively rigid frame of the HMWD 106 maintains the spacing between the BC microphone 116 and the AC microphone 306. While the AC microphone 306 is depicted proximate to the frame bridge 304, in other implementations, the BC microphone 116 may be positioned at the frame bridge 304, or elsewhere with respect to the HMWD 106.

One or more components of the HMWD 106 may comprise single unitary pieces or may comprise several discrete pieces. For example, the front frame 302, the nosepiece, and so forth, may comprise a single piece, or may be constructed from several pieces joined or otherwise assembled.

Figure 4:
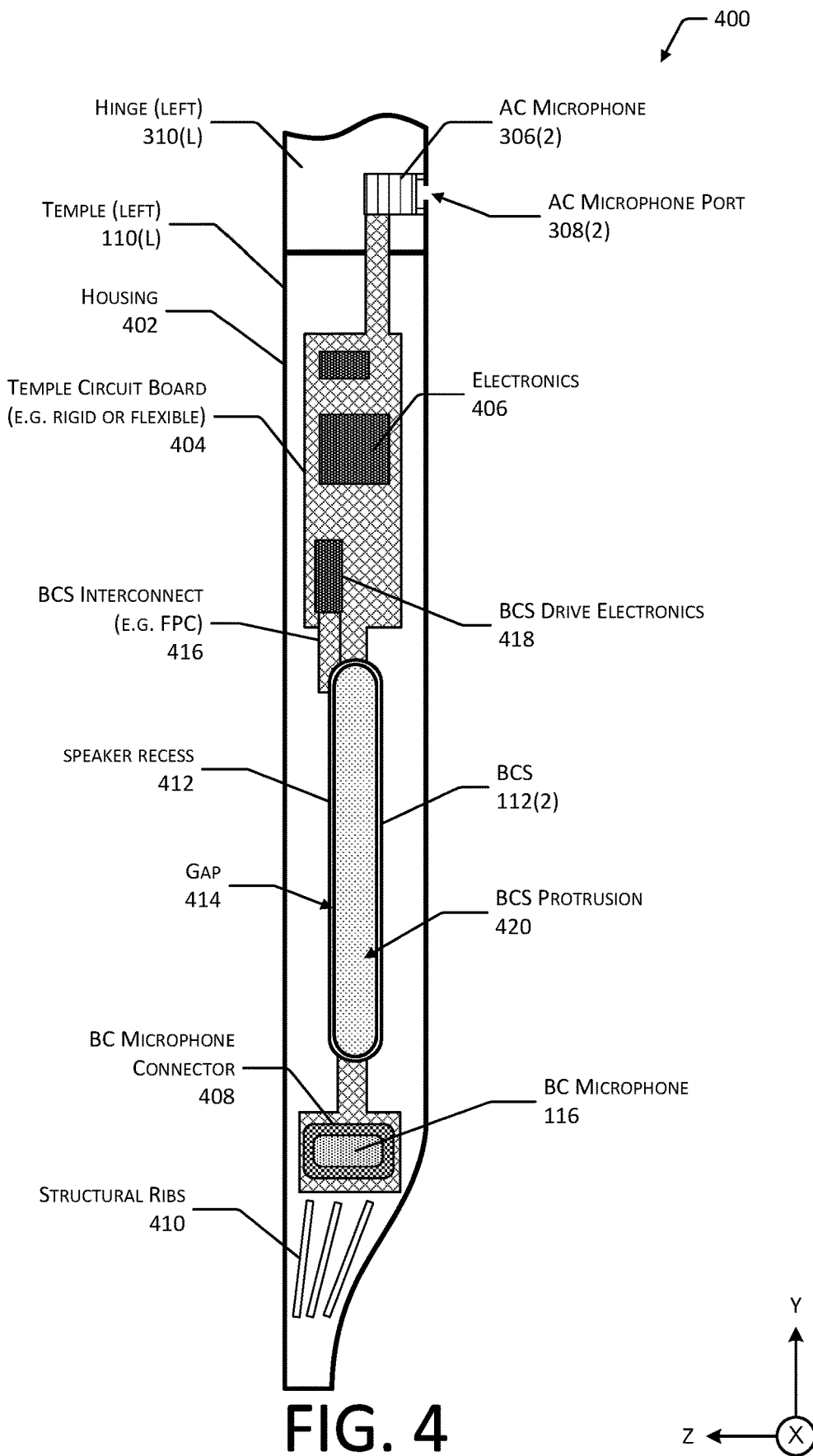
FIG. 4 depicts some of the internal components of a temple of a head-mounted wearable device including a BCS, according to some implementations.

FIG. 4 depicts a view 400 of some of the internal components of a left temple 110(L) of a HMWD 106 including a BCS 112, according to some implementations. The depiction of the left temple 110(L) is provided by way of example and not necessarily as a limitation. For example, the same or similar structures as described herein may be installed in the right temple 110(R).

A portion of the hinge 310 is depicted. Arranged within the hinge 310 is an AC microphone 306. An AC microphone port 308 for the AC microphone 306 in the hinge 310 is depicted. The AC microphone port 308 may open generally downwards. For example, the aperture of the AC microphone port 308 be on a bottom surface of the hinge 310 and may open towards the feet of the user 102 during normal wear.

As described above, the hinge 310 is coupled to a temple 110. The temple 110 may comprise a housing 402. The housing 402 may comprise one or more elements that serve to enclose at least a portion of the temple 110. The housing 402 may comprise a plastic, metal, ceramic, composite material, and so forth.

A temple circuit board 404 is depicted. The temple circuit board 404 may comprise a rigid or flexible circuit board. For example, the temple circuit board 404 may comprise a flexible printed circuit. In some implementations, the temple circuit board 404 may extend at least partially into the hinge 310. For example, the AC microphone 306 may be connected to the temple circuit board 404.

Electronics 406 may be connected to, affixed to, or otherwise in communication with the temple circuit board 404. For example, integrated circuits may be laminated to the temple circuit board 404.

A BC microphone connector 408 may be affixed to the temple circuit board 404. For example, a pressure sensitive adhesive (PSA) may be used to join the temple circuit board 404 and the BC microphone connector 408. In some implementations, the BC microphone connector 408 may comprise a flexible or elastomeric material into which the BC microphone 116 may be emplaced. In the implementation depicted here, the BC microphone 116 is located proximate to the distal end of the temple 110 and is thus closer to the earpiece 318 than the BCS 112.

Depicted in this illustration are structural ribs 410. The structural ribs 410 may be used to add rigidity to a distal portion of the temple 110. The structural ribs 410 may also improve structural support for the earpiece 318 (not shown).

Also depicted is a BCS 112. The BCS 112 be emplaced at least partially within a speaker recess 412. The speaker recess 412 extends within the housing 402 of the temple 110. When mounted within, the BCS 112 is affixed to a bottom of the speaker recess 412. In some implementations a gap 414 around a perimeter of the BCS 112 and one or more walls of the speaker recess 412 may be maintained. By providing this mechanical separation from the sides of the BCS 112 and the housing 402, attenuation due to mechanical coupling between the housing 402 and the BCS 112 is minimized. As a result, output amplitude is increased, providing a greater range of available volume for the user 102.

The BCS 112 is connected via a BCS interconnect 416 to BCS drive electronics 418. The BCS interconnect 416 may comprise circuit traces arranged on the bottom of the speaker recess 412, and the bottom of the BCS 112 may utilize corresponding conductive pads, vias, or other elements to establish an electrical connection. In other implementations the interconnect 416 may comprise a flexible printed circuit, wiring harness, and so forth to provide an electrical connection between the BCS 112 and the drive electronics 418.

When installed, at least a portion of the BCS 112, designated as the BCS protrusion 420, may extend beyond a portion of the housing 402. For example, an outer case of the BCS 112 or upper cap of the BCS 112 may extend above a surface of the housing 402 on an interior side of the temple 110. In other implementations the BCS 112 may be flush with, or recessed relative to, the temple 110.

Figure 5:
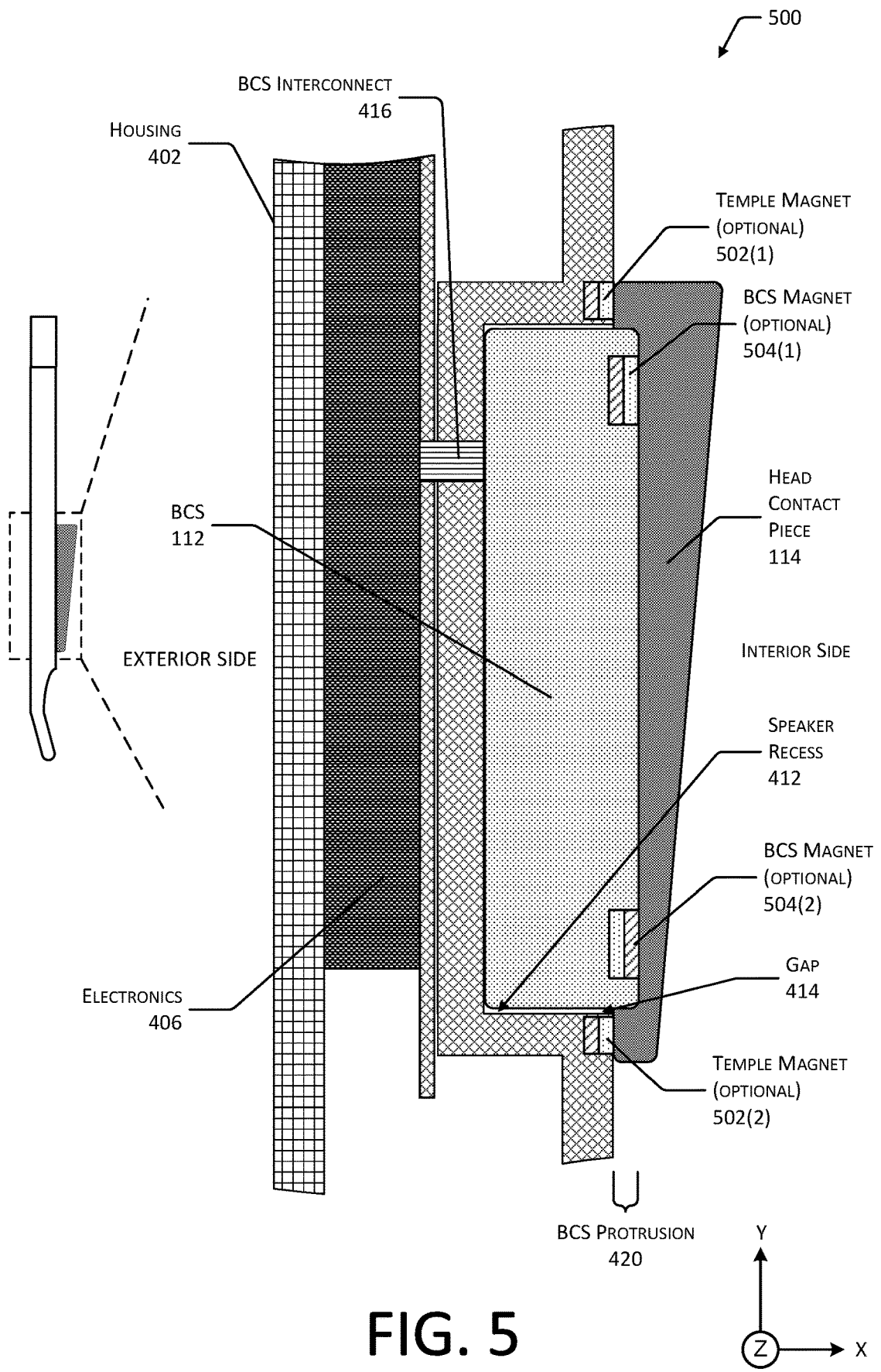
FIG. 5 depicts an enlarged view of a portion of the interior structure of a temple including the mounting of the BCS, according to some implementations.

FIG. 5 depicts an enlarged view 500 of a portion of the interior structure of a temple 110 including the mounting of the BCS 112, according to some implementations.

As described above with regard to FIG. 4, a speaker recess 412 is present in the housing 402. The BCS 112 is emplaced within the speaker recess 412. A bottom surface of the BCS 112 is in contact with a bottom of the speaker recess 412. The BCS 112 may be joined to the speaker recess 412 using an adhesive, fastener, mechanical interference fit, and so forth.

The gap 414 maintained between the perimeter of the BCS 112 and walls of the speaker recess 412. Also shown affixed to an interior side of the BCS 112 is a HCP 114. In some implementations the HCP 114 may be omitted if the surface of the BCS 112 that is in contact with the head 104 provides sufficient mechanical coupling.

The HCP 114 may be affixed to the BCS 112, as shown here. The BCS 112 provides best performance when there is sufficient mechanical coupling with a portion of the head 104 of the user 102. As described, different users 102 may exhibit different head shapes. To improve mechanical coupling between the BCS 112 and different head shapes, a HCP 114 may be affixed to the BCS 112. A variety of different HCPs 114 with different profiles may be utilized.

In one implementation, the HCP 114 may be affixed to the HMWD 106 using one or more magnets or magnetic materials. For example, one or more temple magnets 502 may be located within or affixed to the temple 110. In another example, one or more BCS magnets 504 may be present within or affixed to the BCS 112. The HCP 114 may comprise a ferromagnetic material, such as iron, that is attracted to one or more of the temple magnet 502 or the BCS magnet 504. This magnetic attraction thus holds the HCP 114 to the temple 110.

In some implementations, one or more of the BCS 112, the temple 110, the components within the temple 110, or the HCP 114 may include a ferromagnetic material. For example, the BCS 112 may include one or more components that contain iron while the HCP 114 includes one or more magnets. In another example, the housing 402 may comprise iron that attract magnets within the HCP 114.

When affixed, the HCP 114 may be in direct physical contact with at least a portion of the BCS 112. For example, as depicted here, the BCS protrusion 420 extends above an inner surface of the housing 402. The HCP 114 is positioned such that at least a portion of the BCS protrusion 420 is encompassed within. A portion of the HCP 114 extends around the perimeter of the BCS protrusion 420, and may overlap at least in part the gap 414. In other implementations the HCP 114 may be affixed atop the BCS 112, such that the HCP 114 when installed does not overlap the gap 414. In yet other implementations, the BCS 112 may be recessed with respect to the interior surface of the housing 402, and the HCP 114 may have a corresponding protrusion that extends at least partially into this recess when installed.

Figure 6:
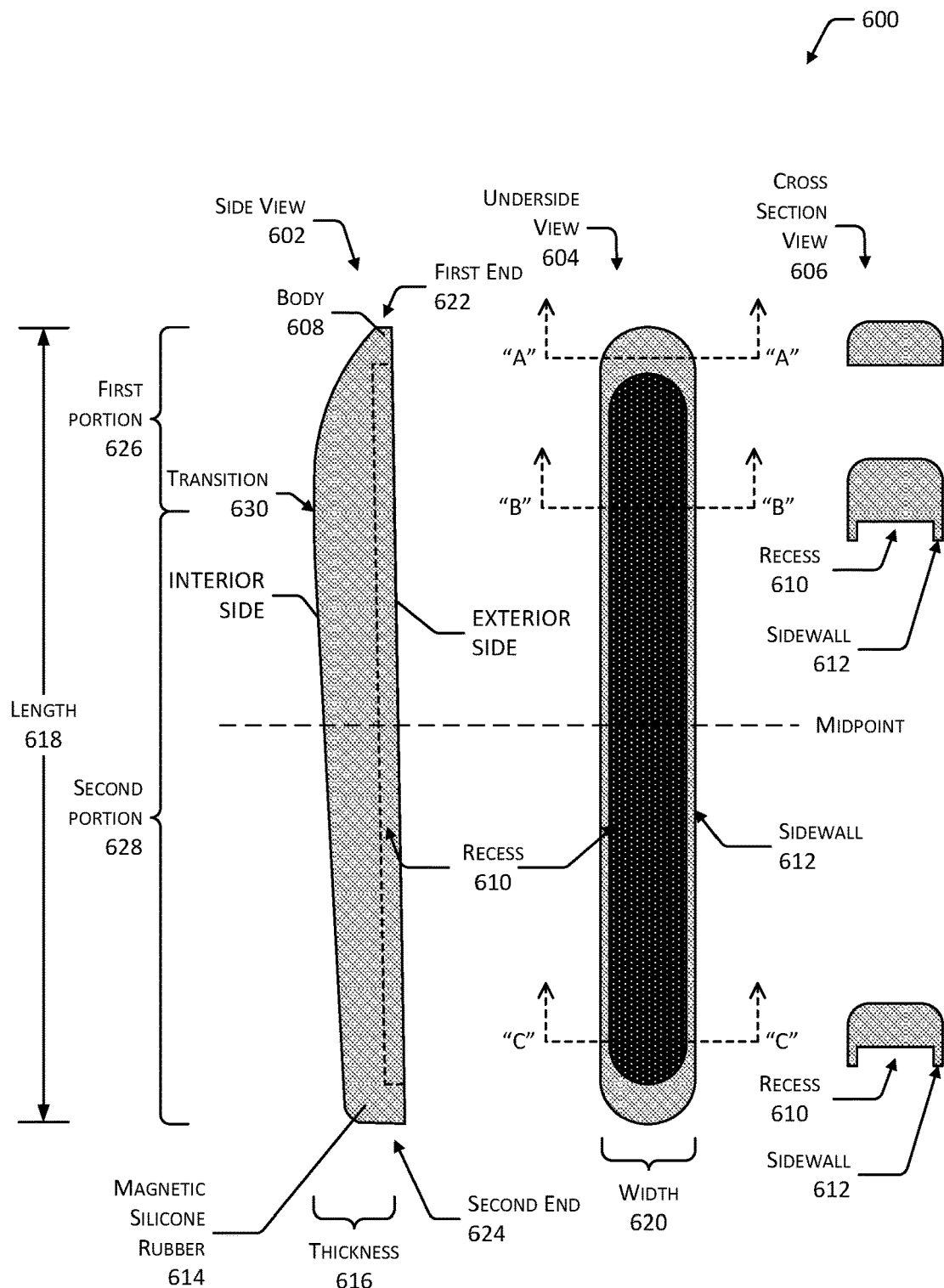
FIG. 6 depicts various views of a head contact piece with a rounded profile, according to some implementations.

FIG. 6 depicts various views 600 of a HCP 114, according to some implementations. Depicted in this figure are a side view 602, an underside view 604, and several cross section views 606. The HCP 114 comprises a body 608. Within the body 608 of the HCP 114 may be one or more recesses 610. The recess 610 extends to within the body 608 and may include one or more sidewalls 612. For example, the sidewalls 612 may describe the boundary of the recess 610. For the implementation shown, when mounted the "footprint" or area of the perimeter of the HCP 114 extends beyond the perimeter of the BCS 112 that protrudes. In other implementations, the footprint of the HCP 114 may be less than that of the perimeter of the BCS 112.

The recess 610 may be configured to accept at least a part of the portion of the BCS 112 that protrudes from the temple 110. For example, the recess 610 may be sized such that the BCS protrusion 420 fits within. The tolerance of the fit may be tight, snug, or loose. For example, a tight fit may require that the user 102 pull or stretch the HCP 114 in order to temporarily change the perimeter of the recess 610 while installing the HCP 114 on the HMWD 106. A snug fit may require some pressure to be applied by the user 102 during installation, while a loose fit may allow the magnetic attraction between the HCP 114 and the HMWD 106 to draw the two together.

The body 608 may comprise one or more materials. For example, the body 608 may be magnetized silicone rubber 614 that comprises a silicone elastomer with ferromagnetic particles supported within. In one implementation, the body 608 may be magnetized, such as when the particles provide a magnetic field. Magnetic attraction between the ferromagnetic particles in the body 608 of the HCP 114 and ferromagnetic materials in the HMWD 106 provide the force that maintains the HCP 114 in place proximate to the BCS 112. In other implementations, other polymers may be used. For example, the body 608 may comprise nitrile rubber, fluorosilicone rubber, ethylene-vinyl acetate, and so forth.

At least a portion of the body 608, such as the interior side, may be exhibit a textured surface or surface features that protrude from the interior side. For example, the interior side of the body 608 may have a flocked texture, present bumps or ridges, and so forth. These features may improve user comfort. For example, the channels provided by ridges may facilitate the dissipation of perspiration produced by the user 102 during wear. These features may also maintain fit. For example, the flocked texture may increase the mechanical engagement between the head 104 and the interior side of the HCP 114, preventing the HMW 106 from becoming dislodged during use.

As illustrated by the side view 602 and the cross section view 606, in one implementation the body 608 of the HCP 114 may exhibit a tapered profile in which the thickness 616 of the body 608 decreases over the length 618. For example, as shown here the body 608 tapers from a first thickness at cross sectional line B-B to a second thickness at cross sectional line C-C. Similarly, the body 608 tapers from the first thickness at cross sectional line B-B to a third thickness at cross sectional line A-A. The taper may be described as linear or nonlinear. A linear taper exhibits a change in thickness that is proportionate to a distance from one or more of the first end or the second end. This proportionality may be expressed as a linear equation. For example, for each 1 mm in increased distance from the first end, the thickness decreases by 0.5 mm, at 2 mm in increased distance the thickness decreases by another 0.5 mm, and so on. As a result, the surface of the second portion 628 may present as a wedge with a flat face. In comparison, the non-linear taper exhibits a proportionality that may be expressed as a non-linear equation. For example, the nonlinear equation may include an exponential factor, such that at 1 mm distance from the first end, the thickness decreases by 0.5 mm, while at 2 mm distance the thickness decreases by an additional 4 mm. As a result, the surface of the second portion 628 may present as a curved or arcuate surface.

In the implementation depicted here the width 620 of the HCP 114 remains the same. However, in other implementations the HCP 114 may exhibit different widths at different points along the length 618.

The recess 610 is depicted as centered with respect to the length 618 and width 620. However, in other implementations the recess 610 may be offset or otherwise arranged.

While the BCS 112 is shown as protruding, in another implementation the configuration may be altered such that the BCS 112 is recessed. In this implementation the HCP 114 may include a protrusion that is sized to fit within the recess 610 of the BCS 112.

The body 608 of the HCP 114 may have a first end 622 and a second end 624. During typical installation, the first end 622 may be proximate to the front frame 302, while the second end 624 is distal to the front frame 302. In other implementations, this orientation may be reversed.

The body 608 may be described as having a first portion 626 and a second portion 628, with a transition 630 between the two. As described above, the first portion 626 may extend from the transition 630 towards the first end 622. The transition 630 may comprise a radius, providing a rounded transition from the first portion 626 to the second portion 628.

The first portion 626 may be arcuate or curved in profile, such as shown here, resulting in the thickness 616 of the body changing with respect to the length 618. For example, the first portion 626 may exhibit a first thickness at a first position proximate to the front frame 302 and a second thickness at a second position that is distal to the front frame 302. In this example, the first thickness is less than the second thickness, and illustrated by the curve in the side view 602.

Likewise, the second portion 628 may extend from the transition 630 towards the second end 624. The second portion 628 may be a flat planar surface, or may be arcuate. In this illustration, the second portion 628 is predominately a flat plane. Continuing the above example, the HCP 114 may exhibit a third thickness at a third position that is proximate to the first portion 626, such as the transition 630. A fourth thickness in the HCP 114 is exhibited at a fourth position that is distal to the first portion. In this example as illustrated in FIG. 6, the third thickness is greater than the fourth thickness.

The position of the transition 630 may be located between a midpoint along the length 618 of the HCP 114 and the first position. For example, as depicted here the transition 630 is located at about one quarter of the distance from the first end 622 to the second end 624. In other implementations the transition 630 may be located elsewhere with respect to the length 618.

The body 608 may comprise a single unitary structure, or may comprise two or more pieces or elements. For example, as shown here the first portion 626 and the second portion 628 are part of a single unitary structure.

The overall size of the body 608 of the HCP 114 may vary. For example, the overall size of the HCP 114 may have a length 618 of between 35 millimeters (mm) and 50 mm and a width 620 of between 3 mm and 6 mm. The thickness 616 may vary from between 1 mm to 15 mm.

The body 608 exhibits an interior side and an exterior side. The interior side is that portion of the body 608 that may be at least partially in contact with the user 102 during normal wear. The exterior side is that portion of the body 608 that is proximate to the temple 110 during normal installation. For example, the exterior side may include the recess 620, as depicted here, that is sized to fit a protrusion of the BCS 112 on the interior side of the temple 110.

Figure 7:
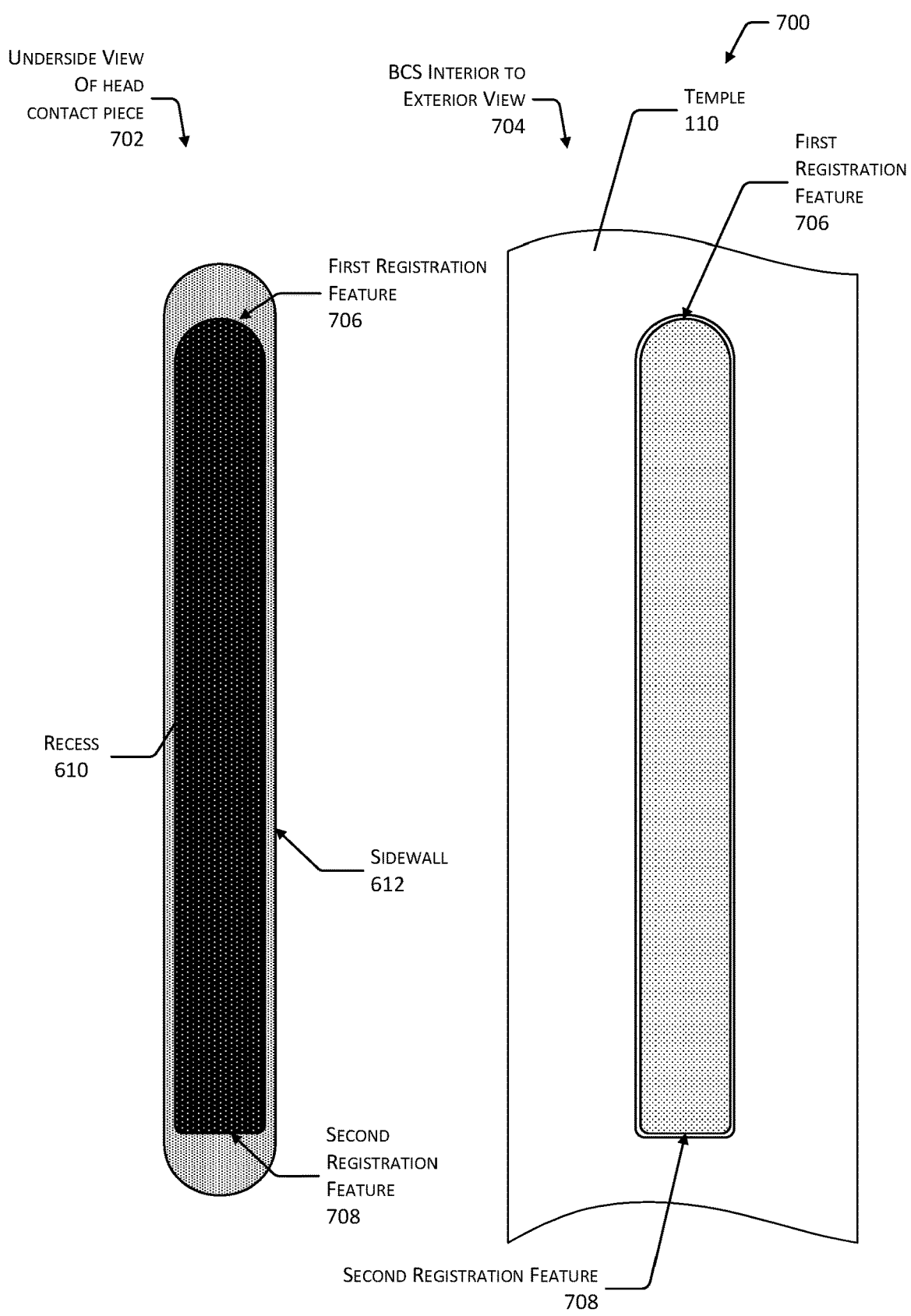
FIG. 7 depicts various views of a head contact piece with registration features to facilitate proper orientation, according to some implementations.

FIG. 7 depicts various views 700 of a HCP 114 with registration features to facilitate proper orientation, according to some implementations. In some implementations the HCP 114 may be designed for use with a particular orientation. For example, the HCP 114 may have an asymmetric profile along the length 618, such as a wedge-shape that tapers from a thicker end to a thinner end. Registration features may be provided that facilitate proper installation of the HCP 114 to the HMWD 106 in the desired orientation. For example, registration features may include a particular shape of the interior surface of the recess 610, protrusions such as bumps or tabs, recesses such as notches or slots, and so forth. Continuing the example, the registration feature may include a protrusion that extends into the recess 610 or a cavity extending away from the recess and into an interior of the body 608.

Depicted in this figure are an underside view of the HCP 702 and a BCS interior to exterior view 704. The underside view 702 depicts a view of the underside of the HCP 114 showing the recess 610. Note that in this figure, the interior shape of the recess 610 is asymmetrical, in particular the ends of the recess 610 have different shapes. A first registration feature 706 at a first end of the recess 610 presents a rounded end feature, while a second registration feature 708 at a second end of the recess 610 presents a squared off shape, with a slight radius at each corner. As shown in the BCS view 704, the BCS 112 as it protrudes from the temple 110 exhibits corresponding or complementary features that extend away from the inner surface of the temple 110. For example, the BCS 112 exhibits the rounded first registration feature 706 at a first end and the second registration feature 708 at the second end. When installed in the proper orientation, the portion of the BCS 112 that protrudes will fit within the corresponding portion of the recess 610.

In other implementations other registration features may be used. Other techniques may also be used to obtain a desired installed orientation of the HCP 114. For example, magnets within the HCP 114 and the HMWD 106 may be arranged such that their polarities are opposite when in the desired orientation, thus providing an attractive magnetic force, and the same when in the undesired orientation, thus providing a repulsive magnetic force. As a result, incorrect installation would result in the HCP 114 failing to "stick" to the HMWD 106.

Figure 8:
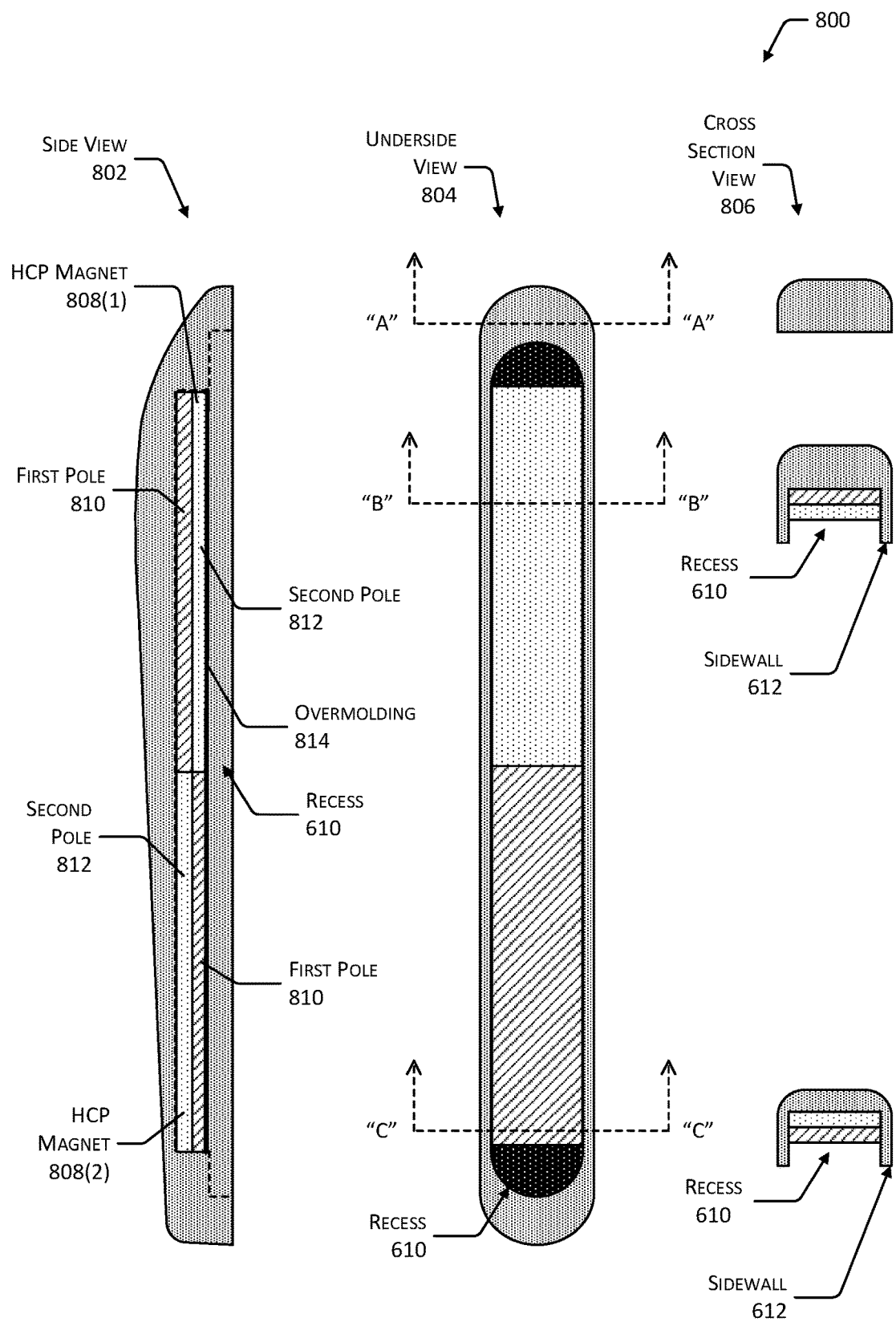
FIG. 8 depicts various views of a head contact piece that incorporates bar magnets within a central portion of a body of the head contact piece, according to some implementations.

FIG. 8 depicts various views 800 of a HCP 114 that incorporates bar magnets within a central portion of the body 608 of the HCP 114, according to some implementations. Depicted in this figure are a side view 802, an underside view 804, and several cross section views 806. Two HCP magnets 808(1) and 808(2), each comprising a bar magnet, are depicted here. In other implementations, the magnets may have other shapes, such as cylinders, square blocks, and so forth. The HCP magnets 808(1) and 808(2) are arranged within the body 608 of the HCP 114 with one pole of each magnet proximate to the recess 610. For example, the HCP magnet 808(1) has a first pole 810 and a second pole 812. The second pole 812 of the HCP magnet 808(1) is closest to the recess 610. The HCP magnet 808(2) abuts the HCP magnet 808(1), such that both magnets are in a common plane, but with an opposite polarity, such that the first pole 810 is closest to the recess 610. With this arrangement, the magnetic fields of the HCP magnets 808 reinforce one another by establishing magnetic flux lines between the two.

The HCP magnets 808 may be formed in place within the body 602, or may be inserted into a recess or cavity provided for such installation within the body 602. In some implementations the HCP magnets 808 may be encapsulated by the body 608. For example, HCP magnets 808 may be overmolded into the body 608.

As depicted here, the recess 610 may extend beyond the boundaries of the HCP magnets 808. For example, the length of the recess 610 is greater than the length from of the combined HCP magnets 808(1) and 808(2).

A covering may be used to cover one or more of the HCP magnets 808. For example, the HCP magnets 808 may be installed and then an overmolding 814 may be emplaced. The overmolding 814 may aid in the retention of the HCP magnets 808 within the recess 610. In another example, the HCP magnets 808 may be installed and a tape or sheet may be used to complete enclosure of the HCP magnets 808.

In this figure the body 602 of the HCP 114 is tapered, it is understood that in other implementations other profiles may be utilized.

Figure 9:
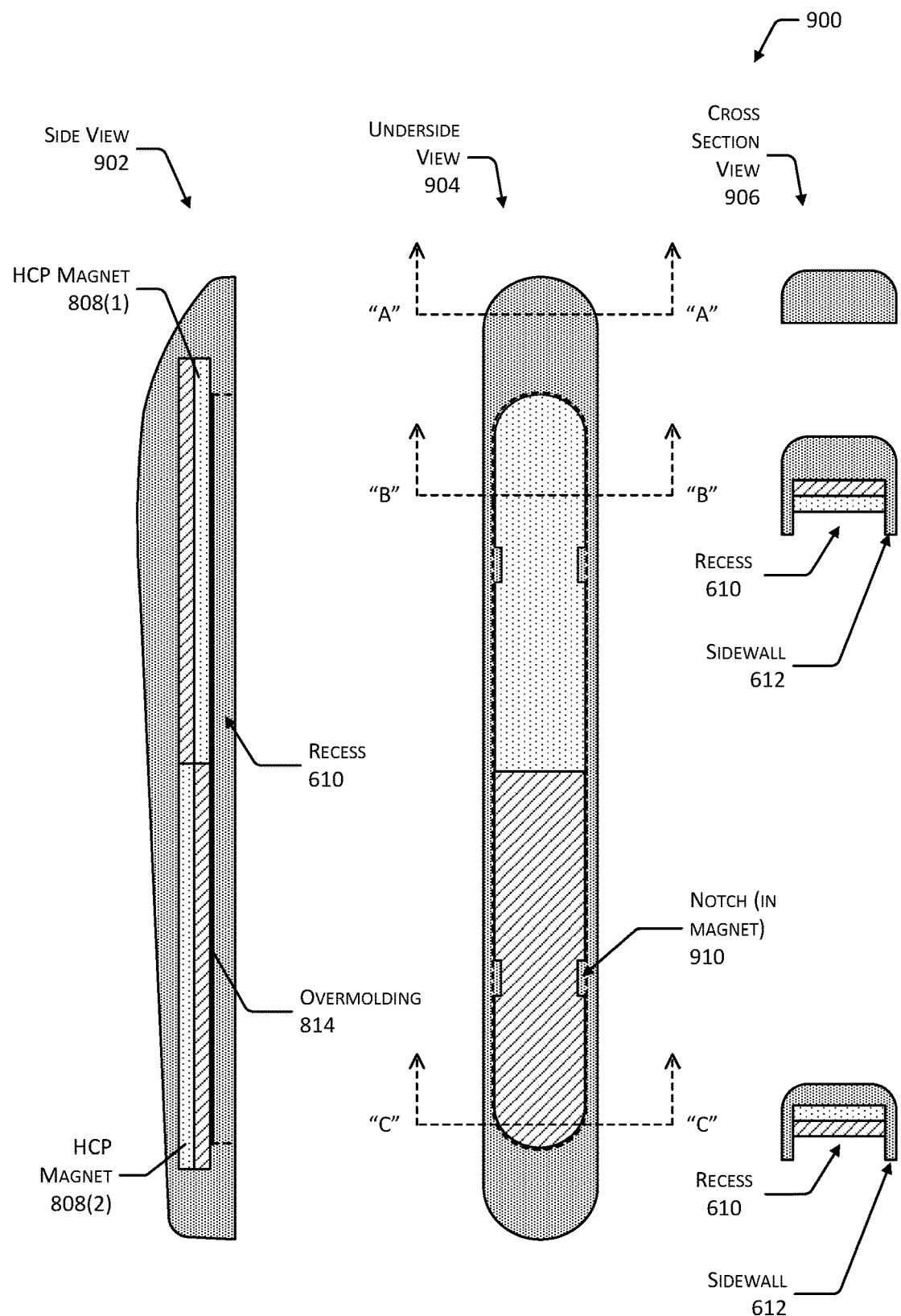
FIG. 9 depicts various views of a head contact piece that incorporates magnets within a central portion of a body of the head contact piece, according to some implementations.

FIG. 9 depicts various views 900 of a HCP 114 that incorporates magnets within a central portion of the body 608, according to some implementations. Depicted in this figure are a side view 902, an underside view 904, and several cross section views 906. Two HCP magnets 808(1) and 808(2), each comprising a bar magnet, are depicted here. In other implementations, the magnets may have other shapes, such as cylinders, square blocks, and so forth. The HCP magnets 808(1) and 808(2) are arranged within the body 608 of the HCP 114 with one pole of each magnet proximate to a recess 908 in the body 608. For example, the HCP magnet 808(1) has a first pole 810 and a second pole 812. The second pole 812 of the HCP magnet 808(1) is closest to the recess 908. The HCP magnet 808(2) abuts the HCP magnet 808(1), such that both magnets are in a common plane, but with an opposite polarity, such that the first pole 810 is closest to the recess 610. With this arrangement, the magnetic fields of the HCP magnets 808 reinforce one another by establishing magnetic flux lines between the two.

As depicted here, the length of the recess 908 is less than the boundaries of the HCP magnets 808. For example, the length of the recess 908 is less than the length from of the combined HCP magnets 808(1) and 808(2).

The HCP magnet 808 may be formed in place within the body 602, or may be inserted into a recess or cavity provided for such installation within the body 602. In some implementations the HCP magnets 808 may be encapsulated by the body 608. For example, HCP magnets 808 may be overmolded into the body 608.

The HCP magnets 808 may include one or more notches 910 or other registration features. The notches 910 may aid in retaining the HCP magnet 808 in a desired position in respect to the body 608. For example, the notches 910 may engage corresponding features such as a tab or protrusion of the body 608 when installed.

In this figure the body 608 of the HCP 114 is tapered, it is understood that in other implementations other profiles may be utilized.

Figure 10:
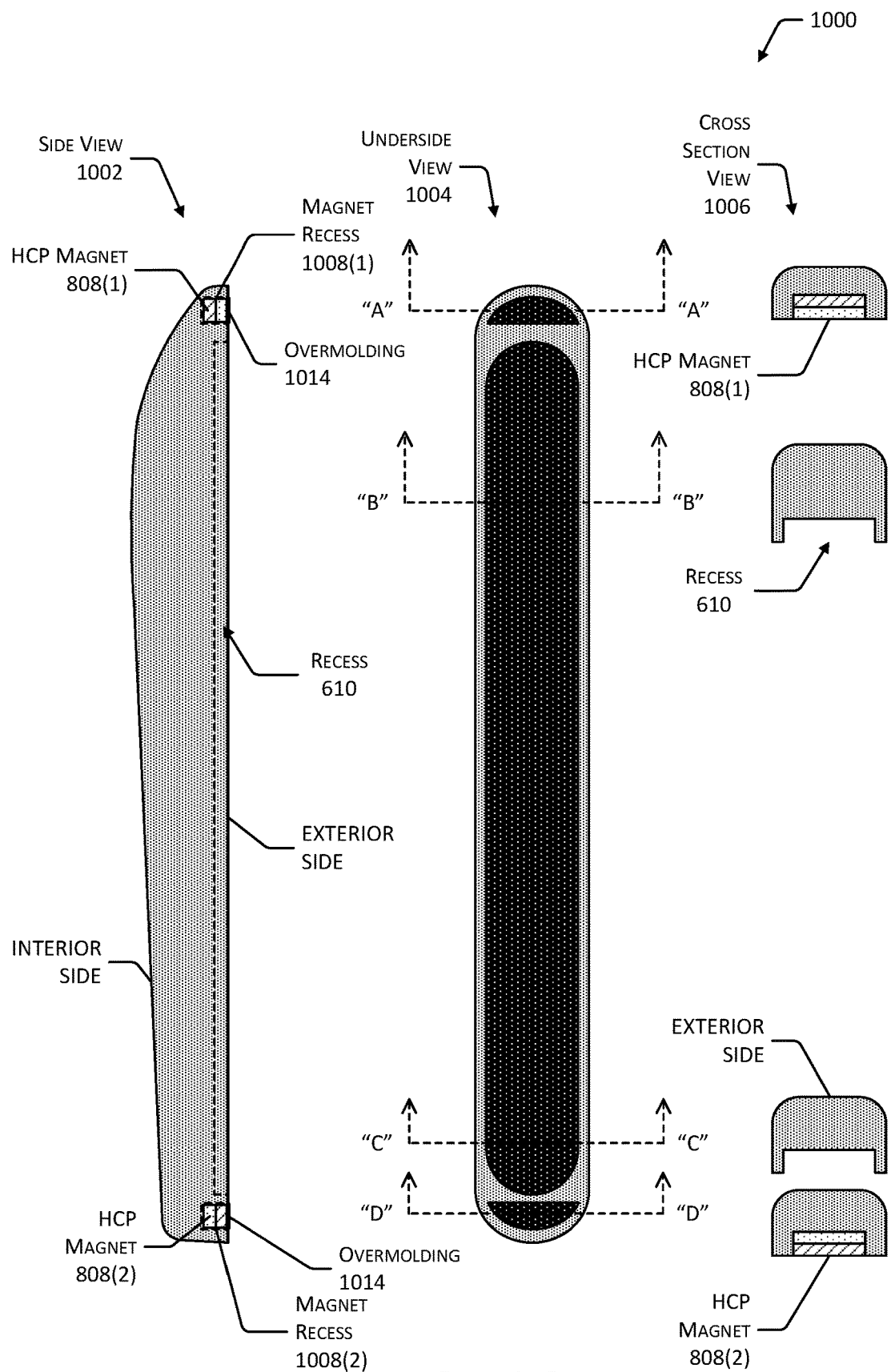
FIG. 10 depicts various views of a head contact piece with that incorporates magnets at either end, according to some implementations.

FIG. 10 depicts various views of a HCP 114 that incorporates magnets within a central portion of a body of the HCP 114, according to some implementations.

Depicted in this figure are a side view 1002, an underside view 1004, and a several cross section views 1006. Two HCP magnets 808(1) and 808(2) are depicted here. The magnets may be provided in a variety of shapes, such as cylinders, bars, square blocks, and so forth. The HCP magnets 808(1) and 808(2) in this implementation are arranged within the body 608 of the HCP 114, at each end of the body 608 of the HCP 114. For example, as shown here, the body 608 may include magnet recesses 1008(1) and 1008(2) arranged at each end of the body 608 along the long axis. The HCP magnets 808(1) and 808(2) are then emplaced within these magnet recesses 1008. Once emplaced, one pole of the HCP magnet 808 is proximate to the exterior side of the HCP 114, and thus will be proximate to the interior side of the HMWD 106 when installed thereto. In other implementations, the HCP magnets 808 may be formed or overmolded within the body 608.

The HCP magnets 808(1) and 808(2) may be arranged with opposing polarities. Each HCP magnet 808 has a first pole 810 and a second pole 812. The second pole 812 of the HCP magnet 808(1) is closest to the exterior side and the HMWD 106. The HCP magnet 808(2) is mounted with an opposite polarity, such that the first pole 810 is closest to the exterior side and the HMWD 106. With this arrangement, the magnetic fields of the HCP magnets 808 may reinforce one another by establishing magnetic flux lines between the two.

As described above, in some implementations the body 608 may comprise ferromagnetic materials. Inclusion of these ferromagnetic materials in the body 608, or discrete ferromagnetic pieces such as an iron bar, may be utilized to guide the magnetic fields produced by the HCP magnets 808. For example, a steel member may be present that joins the opposing poles of the HCP magnets 808. As a result, the overall magnetic field strength of the exposed or open poles proximate to the exterior side may be increased.

In this figure the body 608 of the HCP 114 is tapered, it is understood that in other implementations other profiles may be utilized.

FIG. 11 depicts various views 1100 of a HCP 114 with a wedge profile, according to some implementations. Depicted in this figure are a side view 1102, an underside view 1104, and several cross section views 1106. The HCP 114 comprises a body 608. Within the body 608 of the HCP 114 may be one or more recesses 610. The recess 610 extends to within the body 608 and may include one or more sidewalls 612. For example, the sidewalls 612 may describe the boundary of the recess 610.

The recess 610 may be configured to accept at least a part of the portion of the BCS 112 that protrudes from the temple 110. For example, the recess 610 may be sized such that the BCS protrusion 420 fits within, as described above.

The body 608 of the HCP 114 may have a first end 1108 and a second end 1110. During typical installation, the first end 1108 may be proximate to the front frame 302, while the second end 1110 is distal to the front frame 302. In other implementations, this orientation may be reversed.

An interior side of the body 608 provides a planar surface 1112. This planar surface provides a slope or wedge profile. For example, a first thickness is shown at the first end 1108 along the length 618 of the HCP 114. A second thickness is shown at the second end 1110 of the HCP 114. In this example, the first thickness is greater than the second thickness.

Figure 12:
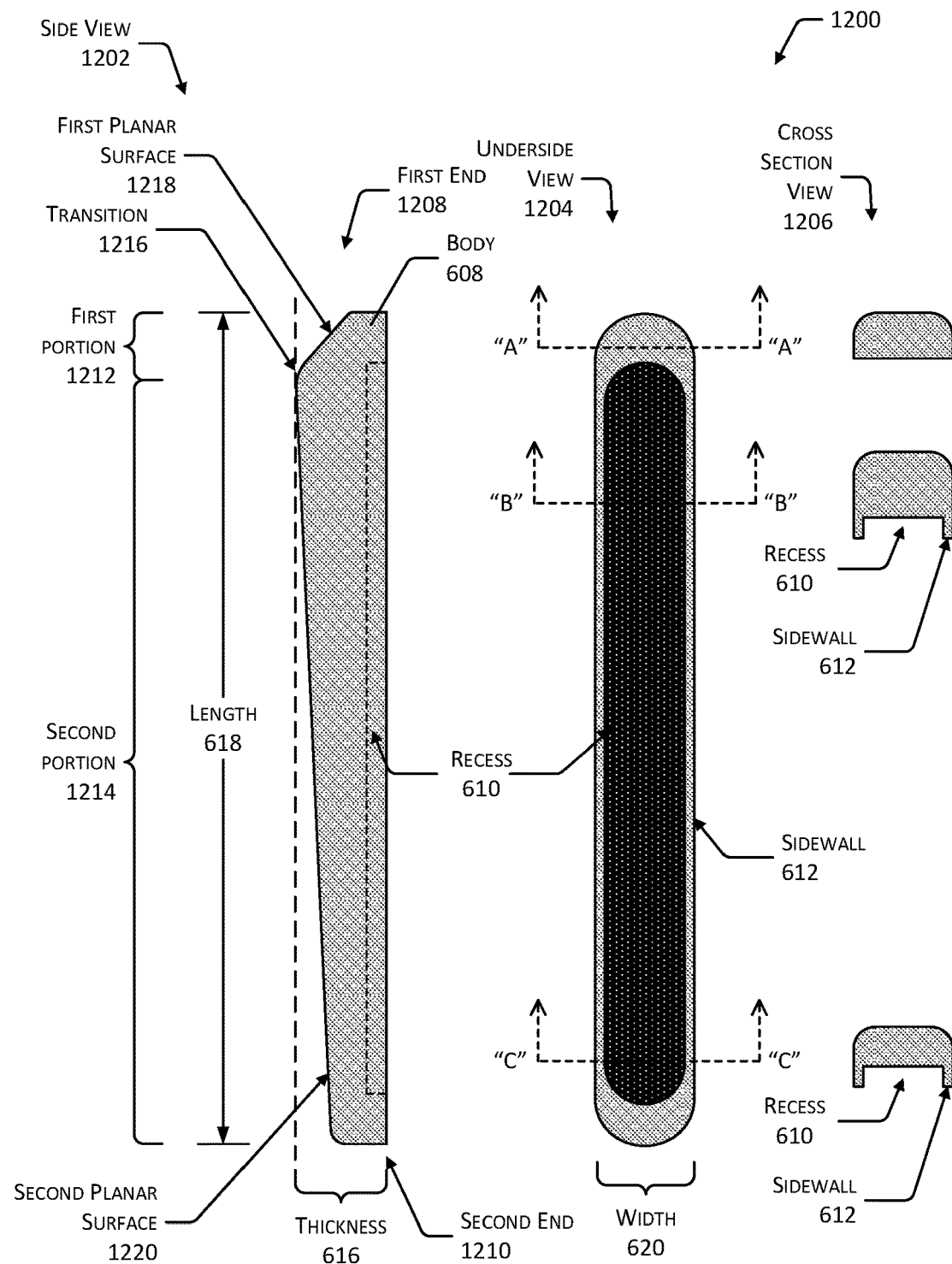
FIG. 12 depicts various views of a head contact piece with rounded dual wedge profile, according to some implementations.

FIG. 12 depicts various views 1200 of an HCP 114 with rounded dual wedge profile, according to some implementations. Depicted in this figure are a side view 1202, an underside view 1204, and several cross section views 1206. The HCP 114 comprises a body 608. Within the body 608 of the HCP 114 may be one or more recesses 610 with one or more sidewalls 612, as described above.

The body 608 of the HCP 114 may have a first end 1208 and a second end 1210. During typical installation, the first end 1208 may be proximate to the front frame 302, while the second end 1210 is distal to the front frame 302. In other implementations, this orientation may be reversed.

The body 608 may be described as having a first portion 1212 and a second portion 1214, with a transition 1216 between the two. The first portion 1212 may extend from the transition 1216 towards the first end 1208. The first portion 1212 may be a first planar surface 1218 in profile, such as shown here, resulting in the thickness 616 of the body changing with respect to the length 618. In other implementations, the first portion may be arcuate. Likewise, the second portion 1214 may extend from the transition 1216 towards the second end 1210. The second portion 1214 may be a second planar surface 1220 as depicted, or may be arcuate.

The transition 1216 may exhibit a radius, providing a rounded transition from the first portion 1212 to the second portion 1214. The body 608 may comprise a single unitary structure, or may comprise two or more pieces or elements. For example, as shown here the first portion 626 and the second portion 628 are part of a single unitary structure.

The body 608 exhibits an interior side and an exterior side. The interior side is that portion of the body 608 that may be at least partially in contact with the user 102 during normal wear. The exterior side is that portion of the body 608 that is proximate to the temple 110 during normal installation. For example, the exterior side may include the recess 620, as depicted here, that is sized to fit a protrusion of the BCS 112 on the interior side of the temple 110.

Figure 13:
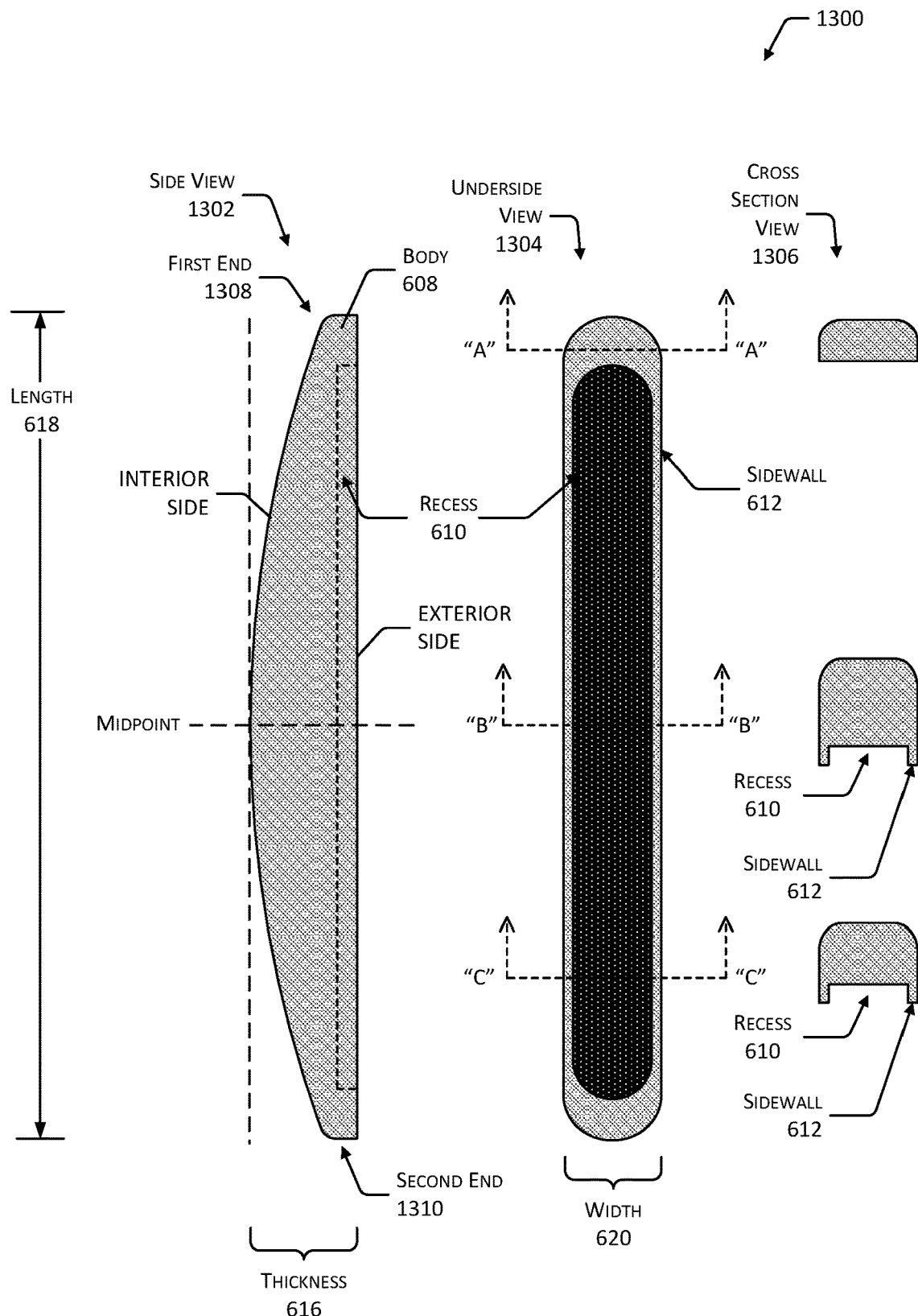
FIG. 13 depicts various views of a head contact piece with a curved profile, according to some implementations.

FIG. 13 depicts various views 1300 of a HCP 114 with a curved profile, according to some implementations. Depicted in this figure are a side view 1302, an underside view 1304, and several cross section views 1306. The HCP 114 comprises a body 608. Within the body 608 of the HCP 114 may be one or more recesses 610 with one or more sidewalls 612, as described above.

The body 608 of the HCP 114 may have a first end 1308 and a second end 1310. During typical installation, the first end 1308 may be proximate to the front frame 302, while the second end 1310 is distal to the front frame 302. In other implementations, this orientation may be reversed.

The body 608 as depicted provides a profile that is curved. In this illustration, the profile is symmetrical, that is, centered about a midpoint along the length 618 of the HCP 114. For example, the thickness 616 of the body 608 at the midpoint may be greater than the thickness at the first end 1308 and the second end 1310. The interior side of the body 608 may be arcuate, curving from the midpoint to the first end 1308 and the second end 1310, respectively.

The curved profile depicted here may provide enhanced mechanical coupling between the BCS 112 and the user 102. The midpoint or thickest portion of the HCP 114 may be aligned or proximate to a portion of the BCS 112 that exhibits maximum displacement during operation. For example, a BCS 112 device such as a piezoelectric transducer may produce greater displacement at the center than at the edges. Continuing the example, the midpoint of the HCP 114 may be aligned with the center of the plane of the BCS 112. In situations where the midpoint of the HCP 114 is aligned with the center of the BCS 112, improved transfer of mechanical motion between the BCS 112 and the user 102 may be obtained.

In other implementations the profile of the HCP 114 may be varied. For example, the radius of the curve may be offset with respect to the midpoint, placing the thickest part of the body 608 at a location other than the midpoint.

Figure 14:
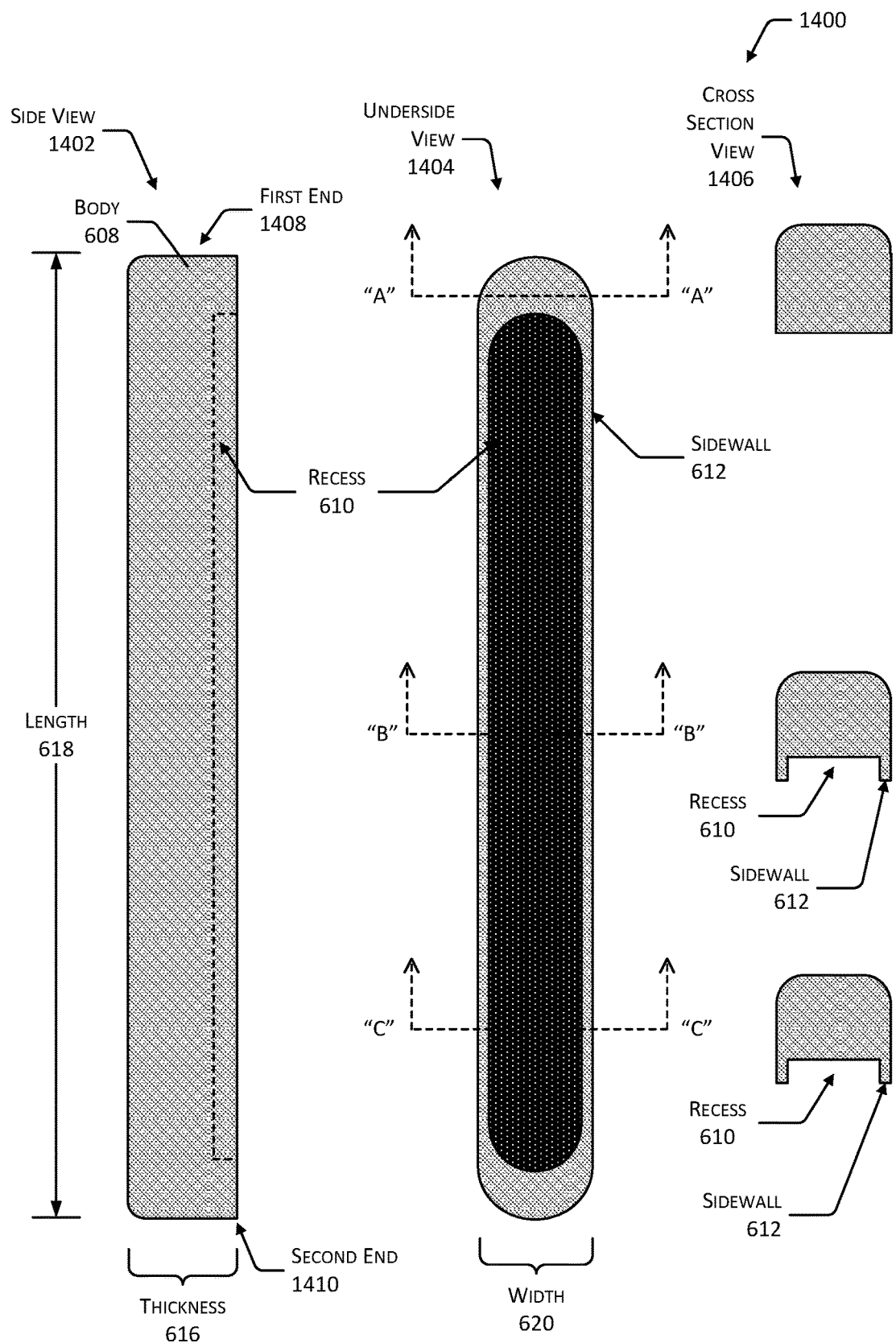
FIG. 14 depicts various views of a head contact piece with a flat profile, according to some implementations.

FIG. 14 depicts various views 1400 of an HCP 114 with a flat profile, according to some implementations. Depicted in this figure are a side view 1402, an underside view 1404, and several cross section views 1406. The HCP 114 comprises a body 608. Within the body 608 of the HCP 114 may be one or more recesses 610 with one or more sidewalls 612, as described above.

The body 608 of the HCP 114 may have a first end 1408 and a second end 1410. During typical installation, the first end 1408 may be proximate to the front frame 302, while the second end 1410 is distal to the front frame 302. In other implementations, this orientation may be reversed.

The body 608 as depicted provides a profile that is flat. For example, the thickness of the first end 1408 is substantially the same as the thickness of the second end 1410, as well as the thickness at points along the length 618. For example, the thickness at a midpoint along the length 618 may be substantially the same as the thickness of the first end 1408 and the second end 1410. In implementations where the body 608 comprises an elastomer, there may be some variation in thickness due to production variances, shrinkage during cure, and so forth.

Figure 15:
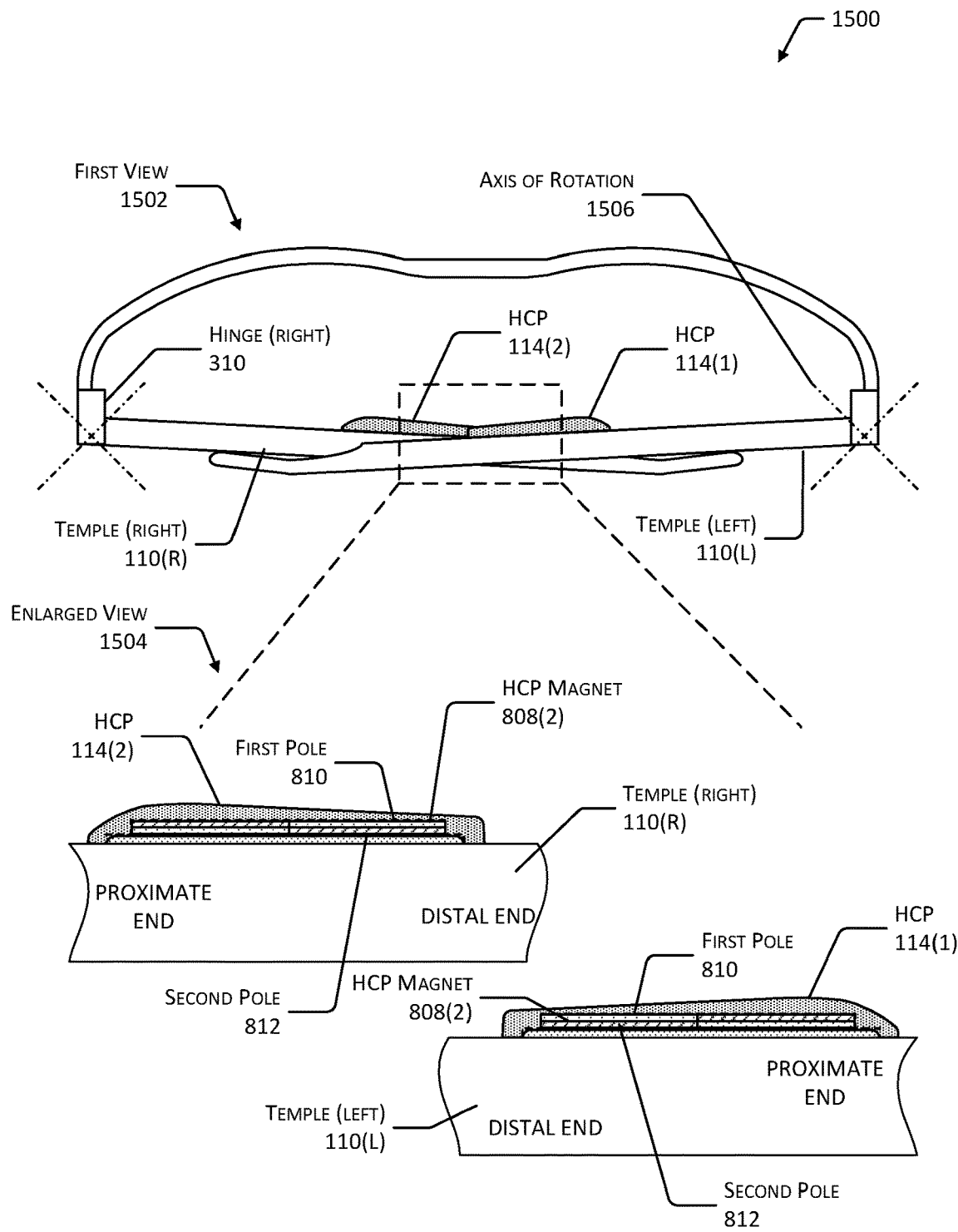
FIG. 15 depicts an exterior view, from below, of the head-mounted wearable device in a closed configuration, and the relative configuration of magnets in the head contact pieces, according to some implementations.

FIG. 15 depicts views 1500 of the device in a closed configuration and enlargements depicting the arrangement of magnets within the HCPs 114, according to some implementations. Shown are a first view 1502 of the HMWD 106 in the closed configuration with HCPs 114 installed, and an enlarged view 1504 showing an enlargement and cutaway view of the respective magnets within the HCP 114.

The HMWD 106 may include hinges 310 that allow the temples 110 to be rotated along an axis of rotation 1506 from the open configuration depicted above, such as in FIG. 2, to a folded configuration. In this closed configuration shown in the first view 1502, at least a portion of one HCP 114(1) may be proximate to the other HCP 114(2). Depending upon the configuration, strength, and physical arrangement of the magnets in the HMWD 106, the HCP 114, or both, the magnetic fields may impinge upon one another. Such impingement could result adverse interactions, such as increasing the force required to return the HMWD 106 to an open configuration, reduction in the magnitude of the attractive force of the magnets, and so forth.

In the enlarged view 1504, the HCP magnets 808 of the respective HCPs 114 are arranged such that, when in the closed configuration and being proximate to one another, opposing poles are presented. For example, when in the closed configuration, the HCP magnet 808(2) of HCP 114(2) presents a first pole 810 to the adjacent first pole 810 of the HCP magnet 808(2) of HCP 114(1). By presenting the same polarity to the adjacent HCP magnets 808, an attractive magnetic force will not result that may increase the force required to separate the temples 110 from one another and return the device to the open configuration.

Similar considerations may be made for other magnets within the HMWD 106. For example, the temple magnets 502, BCS magnets 504, and so forth may be similarly arranged. In some implementations opposing polarities may be presented to increase the attractive force between the temples 110, the HCPs 114, or both. For example, opposing polarities of the HCP magnets 808 may be used to maintain the HMWD 106 in the closed configuration when not being worn.

The various profiles or shapes of HCP 114 as described above may be used in different combinations with the various mechanisms described above to affix the HCP 114 to the HMWD 106. For example, the flat HCP 114 of FIG. 14 may comprise ferromagnetic material within the elastomer, may incorporate one or more HCP magnets 808, and so forth. Instead of, or in addition to, ferromagnetic materials in the flat HCP 114 of FIG. 14, temple magnets 502, BCS magnets 504, adhesive, mechanical engagement features, and so forth may be used to affix the HCP 114 to the HMWD 106. For example, one or more of the BCS 112, the temple 110, may include mechanical engagement features such as one or more recesses or concave engagement features that are shaped to mechanically engage a member protruding from the HCP 114. Continuing the example, the HCP 114 may include mechanical engagement features such as a hook or other member that protrudes and is configured to mechanically engage a corresponding slot in the BCS 112.

Figure 16:
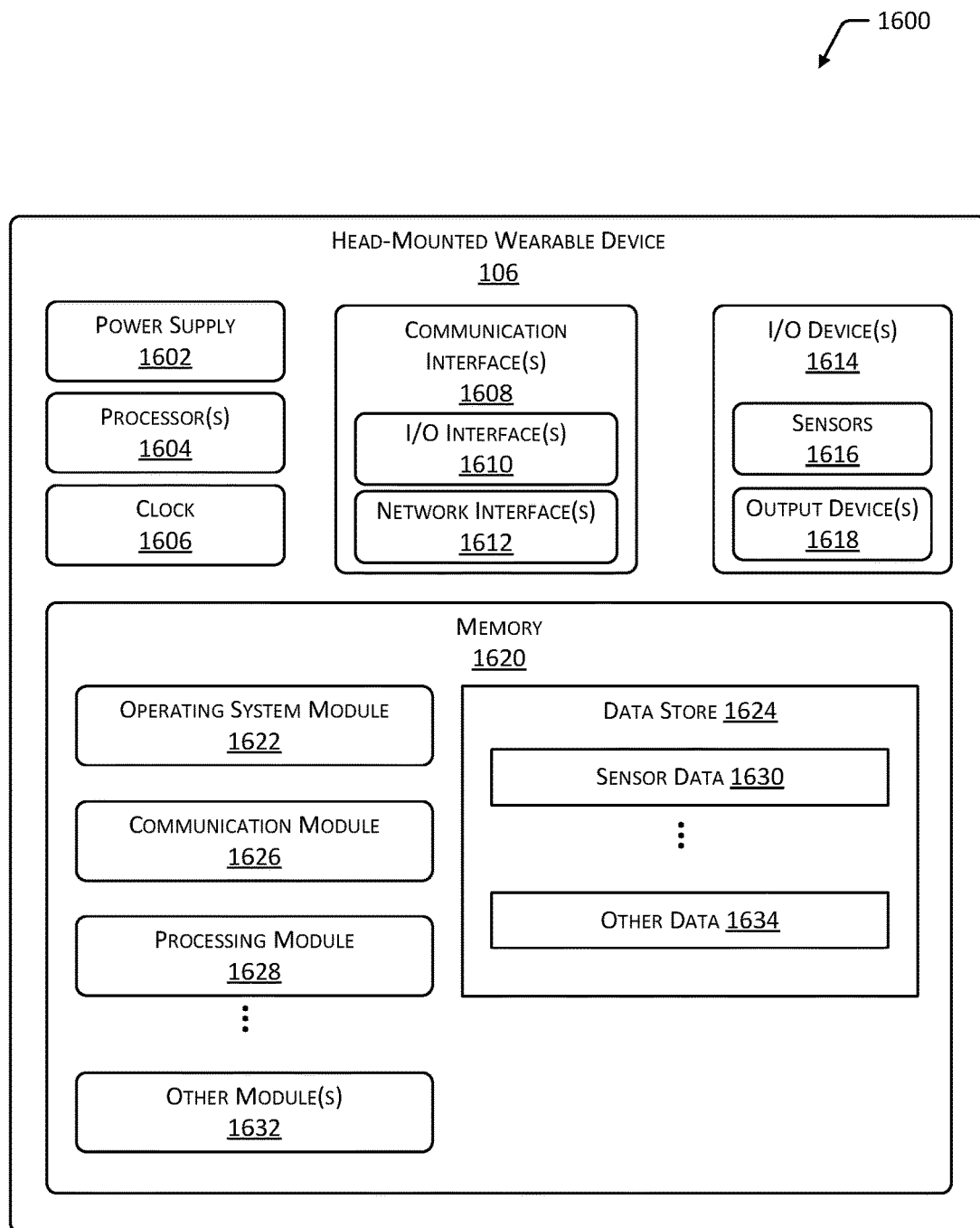
FIG. 16 is a block diagram of electronic components of the head-mounted wearable device, according to some implementations.

FIG. 16 is a block diagram 1600 of components of the head-mounted wearable device 106, according to some implementations.

One or more power supplies 1602 may be configured to provide electrical power suitable for operating the components in the HMWD 106. The one or more power supplies 1602 may comprise batteries, capacitors, fuel cells, photovoltaic cells, wireless power receivers, conductive couplings suitable for attachment to an external power source such as provided by an electric utility, and so forth. For example, the batteries on board the HMWD 106 may be charged wirelessly, such as through inductive power transfer. In another implementation, electrical contacts may be used to recharge the HMWD 106.

The HMWD 106 may include one or more hardware processors 1604 (processors) configured to execute one or more stored instructions. The processors 1604 may comprise one or more cores. The processors 1604 may include general purpose microprocessors, microcontrollers, application specific integrated circuits (ASICs), digital signal processors (DSPs), and so forth. One or more clocks 1606 may provide information indicative of date, time, ticks, and so forth. For example, the processor 1604 may use data from the clock 1606 to associate a particular interaction with a particular point in time.

The HMWD 106 may include one or more communication interfaces 1608 such as input/output (I/O) interfaces 1610, network interfaces 1612, and so forth. The communication interfaces 1608 enable the HMWD 106, or components thereof, to communicate with other devices or components. The communication interfaces 1608 may include one or more I/O interfaces 1610. The I/O interfaces 1610 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 1610 may couple to one or more I/O devices 1614. The I/O devices 1614 may include sensors 1616. The sensors 1616 may include but are not limited to, the AC microphone 306, the BC microphone 116, the touch sensor 312, the button 314, a camera, a proximity sensor, a barometer, a light sensor, an inertial measurement unit, a magnetometer, and so forth. The I/O devices 1614 may also include output devices 1618. The output devices 1618 may include but are not limited to display lights, graphical displays, BCSs 112, the haptic output devices, air conduction speakers, and so forth. The display lights may comprise one or more light-emitting diodes, quantum dots, incandescent lamps, electroluminescent materials, and so forth. When activated, a display light emits light. One or more display lights may be positioned within the field of view of the user 102 while the HMWD 106 is worn on the head 104. For example, one or more display lights may be arranged just above one or both lenses 316 of the HMWD 106, such as on the front frame 302.

In some embodiments, the I/O devices 1614 may be physically incorporated with the HMWD 106 or may be externally placed. The output devices 1618 are configured to generate signals, which may be perceived by the user 102 or may be detected by sensors 1616.

The network interfaces 1612 may be configured to provide communications between the HMWD 106 and other devices, such as the server 120. The network interfaces 1612 may include devices configured to couple to personal area networks (PANS), wired or wireless local area networks (LANs), wide area networks (WANs), and so forth. For example, the network interfaces 1612 may include devices compatible with Ethernet, Wi-Fi®, Bluetooth®, Bluetooth® Low Energy, ZigBee®, and so forth.

The HMWD 106 may also include one or more busses or other internal communications hardware or software that allow for the transfer of data between the various modules and components of the HMWD 106.

As shown in FIG. 10, the HMWD 106 includes one or more memories 1620. The memory 1620 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 1620 provides storage of computer-readable instructions, data structures, program modules, and other data for the operation of the HMWD 106. A few examples of functional modules are shown stored in the memory 1620, although the same functionality may alternatively be implemented in hardware, firmware, or as a system on a chip (SoC).

The memory 1620 may include at least one operating system (OS) module 1622. The OS module 1622 is configured to manage hardware resource devices such as the I/O interfaces 1610, the I/O devices 1614, the communication interfaces 1608, and provide various services to applications or modules executing on the processors 1604. The OS module 1622 may implement a variant of the FreeBSD® operating system as promulgated by the FreeBSD Project; other UNIX™ or UNIX-like variants; a variation of the Linux™ operating system as promulgated by Linus Torvalds; the Windows® operating system from Microsoft Corporation of Redmond, Wash., USA; and so forth.

Also stored in the memory 1620 may be a data store 1624 and one or more of the following modules. These modules may be executed as foreground applications, background tasks, daemons, and so forth. The data store 1624 may use a flat file, database, linked list, tree, executable code, script, or other data structure to store information. In some implementations, the data store 1624 or a portion of the data store 1624 may be distributed across one or more other devices including servers 160, network attached storage devices, and so forth.

The communication module 1626 may be configured to establish communications with one or more of the computing devices 108, other HMWDs 106, servers 160, sensors 1616, or other devices. The communications may be authenticated, encrypted, and so forth.

The processing module 1628 may use sensor data 1630 to determine user inputs, determine information about the environment around the HMWD 106, and so forth. For example, the sensor data 1630 may comprise audio output data generated by one or more of the AC microphone 306, the BC microphone 116, and so forth.

During operation of the system the data store 1624 may store the sensor data 1630 or other data at least temporarily, in the data store 1624.

Techniques such as artificial neural networks (ANN), active appearance models (AAM), active shape models (ASM), principal component analysis (PCA), classifiers, cascade classifiers, and so forth, may also be used to process data.

Other modules 1632 may also be present in the memory 1620 as well as other data 1634 in the data store 1624. For example, the other modules 1632 may include a contact management module while the other data 1634 may include address information associated with a particular contact, such as an email address, telephone number, network address, uniform resource locator, and so forth.

Figure 17:
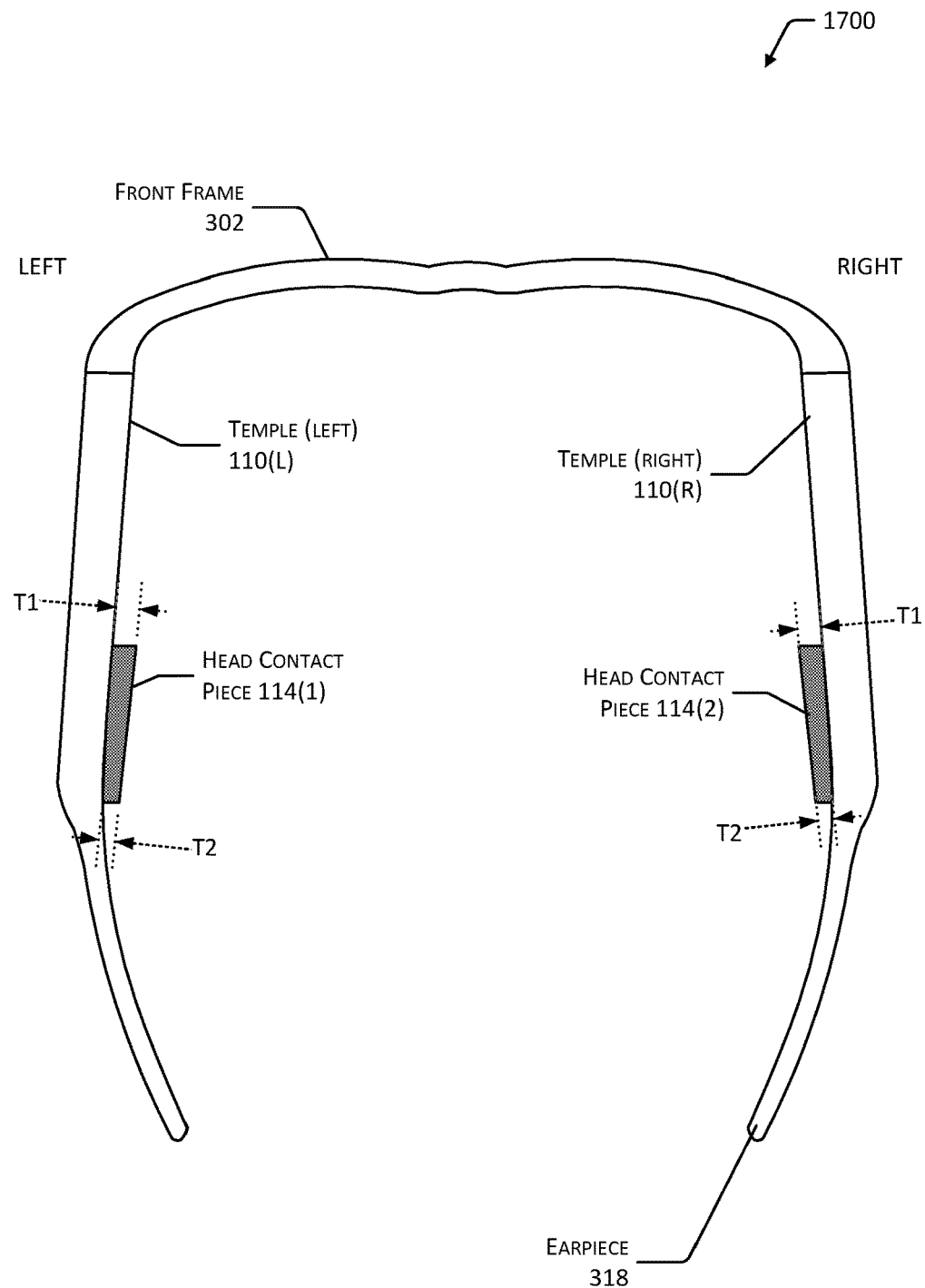
FIG. 17 depicts a view of the head-mounted wearable device with the head contact pieces installed, according to some implementations.

FIG. 17 depicts a view 1700 of the HMWD 106 with the HCPs 114 installed, according to some implementations. As shown in this view, the HCPs 114 are arranged such that, when worn, the HCPs 114 come into contact with the temporal bone of the user 102. As described above, to provide for user comfort, different uses, and so forth, the HCPs 114 may be removeable. The HCP 114 may either be omitted altogether, with the user 102 having direct contact with a portion of the BCS 112, or an HCP 114 with a particular profile, composition, and so forth, may be affixed. In some implementations the HCP 114 may be permanently affixed, integral with the BCS 112, and so forth.

The HCP 114 may vary in size. For example, the HCP 114 may exhibit a length of between 35 millimeters (mm) and 50 mm and a width of between 3 mm and 6 mm. The thickness of the HCP 114 may also vary, such as described above. For example, the BCS 112 may be flush with the temple 110, or may exhibit a BCS protrusion 420 of 1 mm. The thickness of various implementations may vary from between 1.1 mm to 5.2 mm, or greater. For example, the HCP 114 may exhibit a thickness T1 as illustrated here of 2.8 mm and a thickness T2 as illustrated here of 1.5 mm. In some implementations thicknesses T1 and T2 may be approximately the same, while in other implementations thickness T1 may be greater than thickness T2.

Specific physical embodiments as described in this disclosure provided by way of illustration and not necessarily as a limitation. Those having ordinary skill in the art readily recognize that alternative implementations, variations, and so forth may also be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features, structures, and acts are disclosed as exemplary forms of implementing the claims.

What is claimed is:

1. A head-mounted wearable device comprising:
 a front frame;
 a temple connected to the front frame, wherein the temple has a surface;
 a first recess in the surface of the temple;
 a bone conduction speaker that includes a first portion emplaced within the first recess and a second portion that protrudes past the surface of the temple;
 a head contact piece comprising:
  a first end that is closest to the front frame, wherein the first end has a first thickness;
  a second end that is distal to the first end, wherein the second end has a second thickness that is less than the first thickness;
  an interior side comprising a planar surface between the first end and the second end; and
  an exterior side proximate to the temple, the exterior side including a second recess that has one or more sidewalls, wherein the second recess accepts the second portion of the bone conduction speaker.

2. The head-mounted wearable device of claim 1, wherein the head contact piece comprises an elastomer and one or more ferromagnetic materials.

3. The head-mounted wearable device of claim 1, wherein the interior side of the head contact piece comprises one or more of a textured surface or surface features protruding from the interior side.

4. A head-mounted wearable device comprising:
 a front frame;
 a temple connected to the front frame;
 a first recess in the temple;
 a bone conduction speaker that includes a first portion emplaced within the first recess and a second portion that protrudes past a surface of the temple;
 a head contact piece comprising:
  a body that is configured to come in contact with at least a portion of a head of a user while the head-mounted wearable device is in a position for use, wherein the body comprises:
   a first position that is closest to the front frame, wherein the first position has a first thickness;

a second position that is distal to the first position, wherein the second position has a second thickness that is less than the first thickness;
an interior side; and
an exterior side proximate to the temple, the exterior side including a second recess that has one or more sidewalls, wherein the second recess accepts the second portion of the bone conduction speaker.

5. The head-mounted wearable device of claim 4, wherein the interior side of the head contact piece comprises a planar surface between the first position and the second position.

6. The head-mounted wearable device of claim 4, wherein the head contact piece further comprises:
a third position that is located at a midpoint along a length of the head contact piece between the first position and the second position.

7. The head-mounted wearable device of claim 6, wherein the head contact piece further comprises:
a third thickness proximate to the third position along the length of the head contact piece; and
a fourth thickness proximate to a fourth position along the length of the head contact piece, wherein the fourth position is distal to the third position.

8. The head-mounted wearable device of claim 4, wherein the head contact piece comprises an elastomer and one or more ferromagnetic materials.

9. The head-mounted wearable device of claim 4, wherein the head contact piece has a length of between 35 millimeters (mm) and 50 mm and a width of between 3 mm and 6 mm.

10. The head-mounted wearable device of claim 4, wherein the head contact piece comprises an elastomer exhibiting a Shore hardness of 60A.

11. The head-mounted wearable device of claim 4, wherein the interior side of the head contact piece comprises one or more of a textured surface or surface features protruding from the interior side.

12. A head-mounted wearable device comprising:
a front frame;
a temple connected to the front frame;
a bone conduction speaker having a first portion that protrudes from a surface of the temple;
a head contact piece comprising:
a body for coming into contact with at least a portion of a head of a user while the head-mounted wearable device is in a position for use, wherein the body comprises:
a first position closest to the front frame, wherein the first position has a first thickness;
a second position distal to the first position, wherein the second position has a second thickness that is less than the first thickness;
an interior side; and
an exterior side proximate to the temple, the exterior side including a recess that has one or more sidewalls, wherein the recess accepts the first portion of the bone conduction speaker.

13. The head-mounted wearable device of claim 12, wherein the interior side comprises one or more of a textured surface or surface features protruding from the interior side.

14. The head-mounted wearable device of claim 12, wherein the head contact piece further comprises a third thickness at a midpoint along a length between the first position and the second position, wherein the third thickness is greater than the first thickness and the second thickness.

15. The head-mounted wearable device of claim 14, wherein the midpoint of the head contact piece is proximate to a portion of the bone conduction speaker that exhibits maximum displacement during operation.

16. The head-mounted wearable device of claim 12, wherein the exterior side of the head contact piece comprises a planar surface and the interior side is arcuate.

17. The head-mounted wearable device of claim 1, further comprising:
one or more magnets arranged within the head contact piece.

18. The head-mounted wearable device of claim 1, wherein the second recess includes at least one registration feature.

19. The head-mounted wearable device of claim 18, the at least one registration feature comprising one or more of:
a specified shape of at least a portion of the second recess;
a protrusion extending into the second recess; or
a cavity extending away from the second recess and into the interior side of the head contact piece.

20. The head-mounted wearable device of claim 12, further comprising one or more mechanical engagement features configured to join the head contact piece to the bone conduction speaker.

* * * * *